(12) United States Patent
Kim et al.

(10) Patent No.: US 10,895,260 B2
(45) Date of Patent: Jan. 19, 2021

(54) SCROLL COMPRESSOR WITH OIL SEPARATION MEMBER

(71) Applicant: LG ELECTRONICS INC., Seoul (KR)

(72) Inventors: Cheolhwan Kim, Seoul (KR); Kangwook Lee, Seoul (KR); Taekyoung Kim, Seoul (KR); Byeongchul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 302 days.

(21) Appl. No.: 15/975,806

(22) Filed: May 10, 2018

(65) Prior Publication Data

US 2018/0328364 A1   Nov. 15, 2018

(30) Foreign Application Priority Data

May 12, 2017 (KR) .......................... 10-2017-0059503

(51) Int. Cl.
*F04C 29/02* (2006.01)
*B01D 50/00* (2006.01)
(Continued)

(52) U.S. Cl.
CPC ............ *F04C 29/026* (2013.01); *B01D 45/14* (2013.01); *B01D 50/002* (2013.01);
(Continued)

(58) Field of Classification Search
CPC .. F04C 29/026; F04C 18/0215; F04C 23/008; F04C 29/0085; F04C 29/12; F04C 29/02; B01D 50/002
(Continued)

(56) References Cited

U.S. PATENT DOCUMENTS 4,958,993 A * 9/1990 Fujio ..................... F04C 27/005
                                                                418/55.3
5,037,278 A * 8/1991 Fujio ................... F04C 18/0215
                                                                418/181
(Continued)

FOREIGN PATENT DOCUMENTS

DE       102005040971       3/2006
EP         0864754            9/1998
(Continued)

OTHER PUBLICATIONS

English translation of JP-04022783 by Espacenet, Apr. 7, 2020.*
European Extended Search Report in European Application No. 18171087.2, dated Oct. 10, 2018, 12 pages.

*Primary Examiner* — Deming Wan
(74) *Attorney, Agent, or Firm* — Fish & Richardson P.C.

(57) ABSTRACT

A scroll compressor includes a casing, and an internal sealed space in the casing; a drive motor configured with a stator and a rotor which rotates within the stator, and that has an internal flow passage and an external flow passage; a rotation shaft connected to the rotor; a compression unit that includes a first scroll, and a second scroll which is engaged with the first scroll to form a compression chamber, with which the rotation shaft is eccentrically combined; a discharge pipe that communicates with an upper space of the internal space; an oil separation member disposed in the upper space; and a guidance member that is provided between an upper end of the drive motor and a lower end of the discharge pipe and guides the refrigerant with which the oil is mixed, to the oil separation member.

14 Claims, 13 Drawing Sheets

(51) Int. Cl.
  *F04C 18/02* (2006.01)
  *F04C 23/00* (2006.01)
  *F04C 29/12* (2006.01)
  *B01D 45/14* (2006.01)
  *F04C 29/00* (2006.01)
  *F04C 29/04* (2006.01)

(52) U.S. Cl.
  CPC ........ F04C 18/0215 (2013.01); F04C 23/008 (2013.01); F04C 29/0085 (2013.01); F04C 29/12 (2013.01); *F04C 29/045* (2013.01); *F04C 2210/26* (2013.01); *F04C 2240/30* (2013.01); *F04C 2240/40* (2013.01); *F04C 2240/806* (2013.01)

(58) Field of Classification Search
  USPC .................................................... 418/94, 55.6
  See application file for complete search history.

(56) References Cited

U.S. PATENT DOCUMENTS

| | | | |
|---|---|---|---|
| 5,213,490 A * | 5/1993 | Yamamoto | F04C 23/008 418/55.6 |
| 5,263,822 A * | 11/1993 | Fujio | F04C 18/0215 418/55.4 |
| 2006/0057012 A1* | 3/2006 | Park | F04C 18/0215 418/55.6 |
| 2008/0101974 A1* | 5/2008 | Ro | F04C 18/3564 418/55.6 |
| 2012/0174620 A1* | 7/2012 | Takashima | F04C 18/3564 62/498 |
| 2013/0171017 A1* | 7/2013 | Park | F04C 18/3564 418/55.5 |
| 2015/0159649 A1* | 6/2015 | Koyama | F04C 23/008 417/410.5 |
| 2016/0040672 A1* | 2/2016 | Lee | F04C 29/026 417/410.5 |
| 2017/0089624 A1 | 3/2017 | Yokoyama et al. | |
| 2018/0223842 A1* | 8/2018 | Stover | F04C 18/023 |

FOREIGN PATENT DOCUMENTS

| | | | | |
|---|---|---|---|---|
| JP | 198476783 U | 5/1984 | | |
| JP | 1985105880 U | 7/1985 | | |
| JP | 1986123891 U | 8/1986 | | |
| JP | 1986125693 U | 8/1986 | | |
| JP | 1986197278 U | 12/1986 | | |
| JP | 1987111986 U | 7/1987 | | |
| JP | 1987247188 | 10/1987 | | |
| JP | 1991114593 U | 11/1991 | | |
| JP | 04022783 A * | 1/1992 | ............ | F04C 23/008 |
| JP | 05001683 | 1/1993 | | |
| JP | H09100784 | 4/1997 | | |
| JP | H10103264 | 4/1998 | | |
| JP | H10159779 | 6/1998 | | |
| JP | 2007205270 | 8/2007 | | |
| KR | 20160017993 | 2/2016 | | |

* cited by examiner

SCROLL COMPRESSOR WITH OIL SEPARATION MEMBER

CROSS-REFERENCE TO RELATED APPLICATION

Pursuant to 35 U.S.C. § 119(a), this application claims the benefit of earlier filing date and right of priority to Korean Application No. 10-2017-0059503, filed on May 12, 2017, the contents of which are incorporated by reference herein in its entirety.

BACKGROUND OF THE DISCLOSURE

1. Field of the Disclosure

The present disclosure relates to a scroll compressor, and particularly to a compressor in which a compression unit is positioned to one side of an electric motor.

2. Background of the Disclosure

A scroll compressor is a compressor in which, while an orbiting motion is performed with multiple scrolls being engaged with each other, a compression chamber which includes an absorption chamber, an intermediate pressure chamber, and a discharge chamber are formed between both scrolls. This type of scroll compressor achieves not only a comparatively high compression when compared with other types of compressor, but also a stable torque due to smooth strokes for refrigerant absorption, compression, and discharge. Therefore, the scroll compressor is widely used for refrigerant compression in an air conditioning apparatus and the like. In recent years, scroll compressors have been introduced in which an eccentric load is reduced, resulting in an operating speed of 180 Hz or higher.

The scroll compressors are categorized into low-pressure compressors in which an absorption pipe communicates with an internal space in a case, which serves as a low-pressure portion, and high-pressure compressors in which the absorption pipe communicates directly with a compression chamber. Thus, in the high-pressure compressor, a drive unit is installed in an absorption space that serves as the low-pressure portion, but in the low-pressure compressor, the drive is installed in a discharge space that serves as a high-pressure portion.

These types of scroll compressors are categorized into upper compression types of scroll compressors and lower compression types of scroll compressors according to positions of the drive unit and a compression unit. In the upper compression type of scroll compressor, the compression unit is positioned above the drive unit, but in the lower compression type of scroll compressor, the compressor unit is positioned below the drive unit.

Normally, in compressors that include a high-pressure type of scroll compressor, a discharge pipe is positioned far away from the compression unit in such a manner that oil is separated from a refrigerant in the internal space in the casing. Therefore, in the high-pressure type of scroll compressor that belongs to the upper compression type of scroll compressor, the discharge pipe is positioned between an electric motor and the compression unit, but the high-pressure type of scroll compressor that belongs to the lower compression type of scroll compressor, the discharge pipe is positioned over the electric motor.

Thus, in the upper compression type of scroll compressor, the refrigerant that is discharged from the compression unit flows from an intermediate space between the electric motor and the compression unit toward the discharge pipe, without flowing up to the electric motor. On the other hand, in the lower compression type of scroll compressor, the refrigerant that is discharged from the compression unit passes through the electric motor, and then flows from an oil separation space, which is formed over the electric motor, toward to the discharge pipe.

At this time, oil that is separated from the refrigerant in an upper space that serves as the separation space passes through the electric motor, and then flows into an oil storage space that is formed under the compression unit. The refrigerant that is discharged from the compression unit passes through the electric motor as well and flows toward the oil separation space.

In the lower compressor type of scroll compressor in the related art, as described above, while the refrigerant and the oil, which are discharged from the compression unit and flows into the upper space, circulates through the upper space, the oil is separated from the refrigerant, the refrigerant from which the oil is separated is driven out of the outside of the compressor through the discharge pipe, and the oil collects in the lower space. However, the oil that flows into the upper space is not sufficiently separated from the refrigerant, and thus the oil is driven out of the compressor, along with the refrigerant. As a result, there is a problem in that an increasing oil shortage in the compressor is caused.

Furthermore, in the lower compressor type of scroll compressor in the related art, in a case where an inverter motor in which an operation speed of the electric motor is variable is used, the degree of the oil separation is not constant. There is a problem in that this inconstancy decreases the reliability of the compressor. That is, in a case where the electric motor operates in a high speed (approximately 90 Hz or higher in the case of the compressor) or low speed (approximately 40 to 50 Hz or lower in the case of the compressor), while the refrigerant and the oil that are discharged from the compressor pass through the electric motor and flows into the upper space, an oil separation effect may be achieved to some degree by centrifugal force. However, the dependence on the centrifugal force caused by the rotor makes a satisfactory oil separation effect difficult to expect. In a case where the electric motor operates at an intermediate speed (approximately 60 to 90 Hz in the case of the compressor), there is a limitation in that, characteristically, the oil separation effect that results from the centrifugal force is more decreased.

Furthermore, in the lower compression type of scroll compressor in the related art, a refrigerant discharge path and an oil collection path run in opposite directions and thus interfere with each other. Thus, the refrigerant and the oil cause flow passage resistance. Particularly, the oil does not collect into the oil storage space due to the high-pressure refrigerant. This causes an oil shortage within the casing. Thus, frictional loss or abrasion occurs due to the oil shortage in the compression unit.

Furthermore, as in the lower compression type of scroll compressor in the related art, when the refrigerant discharge path and the oil collection path interfere with each other, the oil that is separated from the refrigerant in the internal space in the casing is mixed again with the refrigerant that is discharged and is discharged to the outside of the compressor. Thus, there occurs a problem in that the oil shortage within a severe compression continues.

Furthermore, the lower compression type of scroll compressor in the related art, an oil collection flow passage along which the oil that collects between the electric motor and the compression unit flows into the lower space in the casing is sufficiently secured. Thus, the oil stays over the compression unit. This increases a likelihood that the oil that is mixed with the refrigerant will flow into the upper space and will be then discharged to the outside of the compressor. As a result, a severer oil shortage within the compressor continues.

SUMMARY OF THE DISCLOSURE

Therefore, an aspect of the detailed description is to provide a scroll compressor that is capable of separating refrigerant and oil within a casing and of minimizing the driving of the oil out of the casing along with the refrigerant.

Another object of the present invention is to provide a scroll compressor that is capable of being less influenced by an operation speed of an electric motor and thus increasing an oil separation effect in all operation bands.

Still another object of the present invention is to provide a scroll compressor in which oil that is separated from refrigerant in an upper space in a casing flows smoothly into a lower space in the casing.

Still another object of the present invention is to provide a scroll compressor in which oil that is separated from refrigerant in an upper space in a casing is prevented in advance from being mixed with refrigerant that flows from a lower space toward the upper space in the casing.

Still another object of the present invention is to provide a scroll compressor in which oil that collects between an electric motor and a compression unit collects into a lower space in a casing without being mixed with refrigerant that is discharged from the compression unit.

Still another object of the present invention is to provide a scroll compressor in which a refrigerant flow passage and an oil flow passage are reliably separated within a casing.

To achieve these and other advantages and in accordance with the purpose of this specification, as embodied and broadly described herein, there is provided a scroll compressor including: a casing that has an internal space; a drive motor that includes a stator which is located within the casing, and a rotor which is rotatably mounted within the stator; a compression unit that is provided below the electric motor; a rotation shaft that transfers drive force from the electric motor to the compression unit; and an oil separation member that is provided above the electric motor and is configured with a mesh through which a refrigerant and oil are separated.

The scroll compressor may further include a guidance member that guides the refrigerant and the oil to the oil separation member, between the oil separation member and the electric motor.

The scroll compressor may further a flow passage separation unit that is installed between the electric motor and the compression unit, and separates a refrigerant flow passage and an oil flow passage.

In the scroll compressor, the flow passage separation unit may be formed with a first flow passage guide that is located on the compression unit and a second flow passage guide that extends from the electric motor, the second flow passage guide may be configured with an insulator that is provided in the electric motor, and a flow passage sealing member may be further provided between the first flow passage guide and the second flow passage guide.

Furthermore, to achieve these and other advantages and in accordance with the purpose of this specification, as embodied and broadly described herein, there is provided a scroll compressor including: a casing, in which an internal space is sealed; a drive motor that is configured with a stator which is located in the internal space in the casing, and a rotor which rotates within the stator, and that has an internal flow passage and an external flow passage that passes through the drive motor itself in an axial direction; a rotation shaft that is connected to the rotor of the drive motor and thus rotates; a compression unit that includes a first scroll which is provided below the drive motor, and a second scroll which is engaged with the first scroll to form a compression chamber while the second scroll performs an orbiting motion with respect to the first scroll, refrigerant that is compressed in the compression chamber is discharged toward the internal space in the casing; a discharge pipe that communicates with an upper space of the internal space in the casing, which is formed above the drive motor; an oil separation member that is provided in the upper space in the casing and separates oil from the refrigerant; and a guidance member that is provided between an upper end of the drive motor and a lower end of the discharge pipe and guides the refrigerant with which the oil is mixed, to the oil separation member.

In the scroll compressor, the oil separation member may be positioned at a distance away from an inlet of the discharge pipe and may be connected to the guidance member.

In the scroll compressor, an upper opening and a lower opening may be formed in the guidance member of which upper and lower ends are open, and the guidance member may separate the upper space into an internal space and an external space.

In the scroll compressor, the lower end of the guidance member may be connected to an inner circumferential surface of the case, and an oil path groove is formed in the vicinity of the lower end of the guidance member, and the oil separation member may be connected to the upper end of the guidance member in such a manner as to fluidly communicate with the upper opening in the guidance member.

In the scroll compressor, the lower end of the guidance member may be provided between the internal flow passage and the external flow passage of the drive motor, and the oil separation member may be connected to the upper end of the guidance member in such a manner as to fluidly communicate with the upper opening in the guidance member.

In the scroll compressor, an upper surface of the oil separation member, which faces an inlet of the discharge pipe, may be formed with a closed plate, a flank surface thereof may be formed with a mesh through which the refrigerant passes, resulting in the oil being separated from the refrigerant, and a lower surface thereof may be open in such a manner as to communicate with the upper opening in the guidance member, and may be connected to the upper end of the guidance member.

In the scroll compressor, the oil separation member may be connected to the discharge pipe.

In the scroll compressor, an upper surface of the oil separation member may be formed with a closed plate, and may be connected to the discharge pipe, a flank surface thereof may be formed with a mesh through which the refrigerant passes, resulting in the oil being separated from the refrigerant, and a lower surface thereof may be formed with a ring-shaped plate of which a center portion is open.

In the scroll compressor, the oil separation member may be provided in such a manner that the mesh overlaps the discharge pipe in the axial direction.

In the scroll compressor, the guidance member may be connected to the rotor of the drive motor or an upper end of the rotation shaft, may extend toward an inner circumferential surface of the casing, and may be positioned at a distance away from a lower surface of the oil separation member.

In the scroll compressor, the upper surface of the guidance member and the oil separation member may be formed in such a manner that a distance between the upper surface of the guidance member and the lower surface of the oil separation member is smaller than a height of a flank surface of the oil separation member.

In the scroll compressor, the guidance member may be formed in such a manner that an outside diameter thereof is equal to or greater than an outside diameter of the oil separation member.

In the scroll compressor, the oil separation member may be fixedly connected to an inner circumferential surface of the casing.

In the scroll compressor, the oil separation member may be configured with a plate that is fixed to the inner circumferential surface of the casing, and a mesh that is formed into the shape of a ring or an arc and is provided in the middle of the plate.

In the scroll compressor, an oil separation plate that extends in the radial direction from an outer circumferential surface of the discharge pipe may be further provided on an inlet of the discharge pipe.

The scroll compressor may further include a flow passage separation unit that is formed into the shape of a ring between the drive motor and the compression unit, and separates a space between the drive motor and the compression unit into an internal space that communicates with the internal flow passage in the drive motor and an external space that communicates with the external flow passage of the drive unit.

Furthermore, to achieve these and other advantages and in accordance with the purpose of this specification, as embodied and broadly described herein, there is provided a scroll compressor including: an electric motor that includes a stator and a rotor; a rotation shaft that is connected to the rotor; a compression unit in which multiple scrolls are engaged with each other for combination of the multiple scrolls, the rotation shaft passes through the multiple scrolls for the combination of the multiple scrolls, a rotation force of the electric motor is transferred to one of the multiple scrolls through the rotation shaft, and fluid is compressed while the one scroll performs an orbiting motion with respect to the other scrolls; a casing that accommodates the electric motor and the compression unit, and has a first space between the electric motor that is positioned above the compression unit and the compression unit that is positioned below the electric motor, has a second space, with which a discharge pipe communicates, above the electric motor, and has a third space, in which an oil feeder that extends from the rotation shaft which passes through the compression unit is accommodated, below the compression unit, a mesh member that is provided in the second space, and separates the fluid which is discharged from the compression unit and passes through the electric motor, into gas and liquid; and a guidance member that is provided between the electric motor and the mesh member, and guides the fluid to the mesh member.

Furthermore, to achieve these and other advantages and in accordance with the purpose of this specification, as embodied and broadly described herein, there is provided a scroll compressor including: a casing; an electric motor that is provided in an internal space in the cashing; a compression unit that is connected to the electric motor and compresses refrigerant while rotating in a state of being connected to the electric motor; a discharge pipe that communicates with an upper space in the casing, which is formed above the electric motor, and that discharges refrigerant which is discharged from the compression unit into the internal space in the casing; an oil separation member that is provided in the upper space in the casing, and includes a mesh that separates oil from the refrigerant before the refrigerant is discharged into a discharge pipe; and a guidance member that is provided between the electric motor and the discharge pipe in the upper space, and guides the refrigerant and the oil which are discharged from the compression unit, to the oil separation member.

In the scroll compressor, an oil separation plate that extends in the radial direction from an outer circumferential surface of the discharge pipe may be further provided on an inlet of the discharge pipe.

In the scroll compressor, a flow passage guide, which separates a space between the electric motor and the compression unit into multiple spaces along the radial direction, may be further included between the electric motor and the compression unit.

In the scroll compressor according to the present invention, the oil separation member including the mesh is installed on the inlet side of the discharge pipe, and thus the refrigerant in which the oil is included passes through the oil separation member, resulting in the oil being separated from the refrigerant. Thus, the driving of the oil out of the compressor in a state of being mixed with the refrigerant is minimized and an amount of collected oil is increased. Accordingly, frictional loss or abrasion due to an oil shortage within the compressor is prevented in advance.

Furthermore, in the scroll compressor according to the present invention, the guidance member that guides the refrigerant to the oil separation member including the mesh is installed above the electric motor, and thus most of the refrigerant and of the oil are guided for the passing-through of the mesh. As a result, an oil separation effect can be increased, and an effect in which the refrigerant and the oil are centrifugally separated by the guidance member can also be expected. Accordingly, according to the present embodiment, the oil separation effect can be improved not only during an intermediate-speed operation, but also during a low- or high-speed operation.

Furthermore, in the scroll compressor according to the present invention, the refrigerant flow passage and the oil flow passage are separated in the internal space in the casing. Thus, while the oil that is separated from the refrigerant in the upper space in the case collects in the lower space on the casing, the oil can be prevented from being re-mixed with the refrigerant.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

A scroll compressor according to an embodiment of the present invention will be described in detail below with reference to the accompanying drawing. For reference and convenience, as a typical example of the embodiment of the scroll compressor according to the present invention, a type of scroll compressor in which a rotation shaft overlaps a volute wrap in the same plane will be described, among lower compression types of scroll compressors in which a compression unit is positioned below an electric motor. It is known that this type of scroll compressor is suitable for application in a freezing cycle under the condition of a high pressure ratio at high-temperature.

Figure 1:
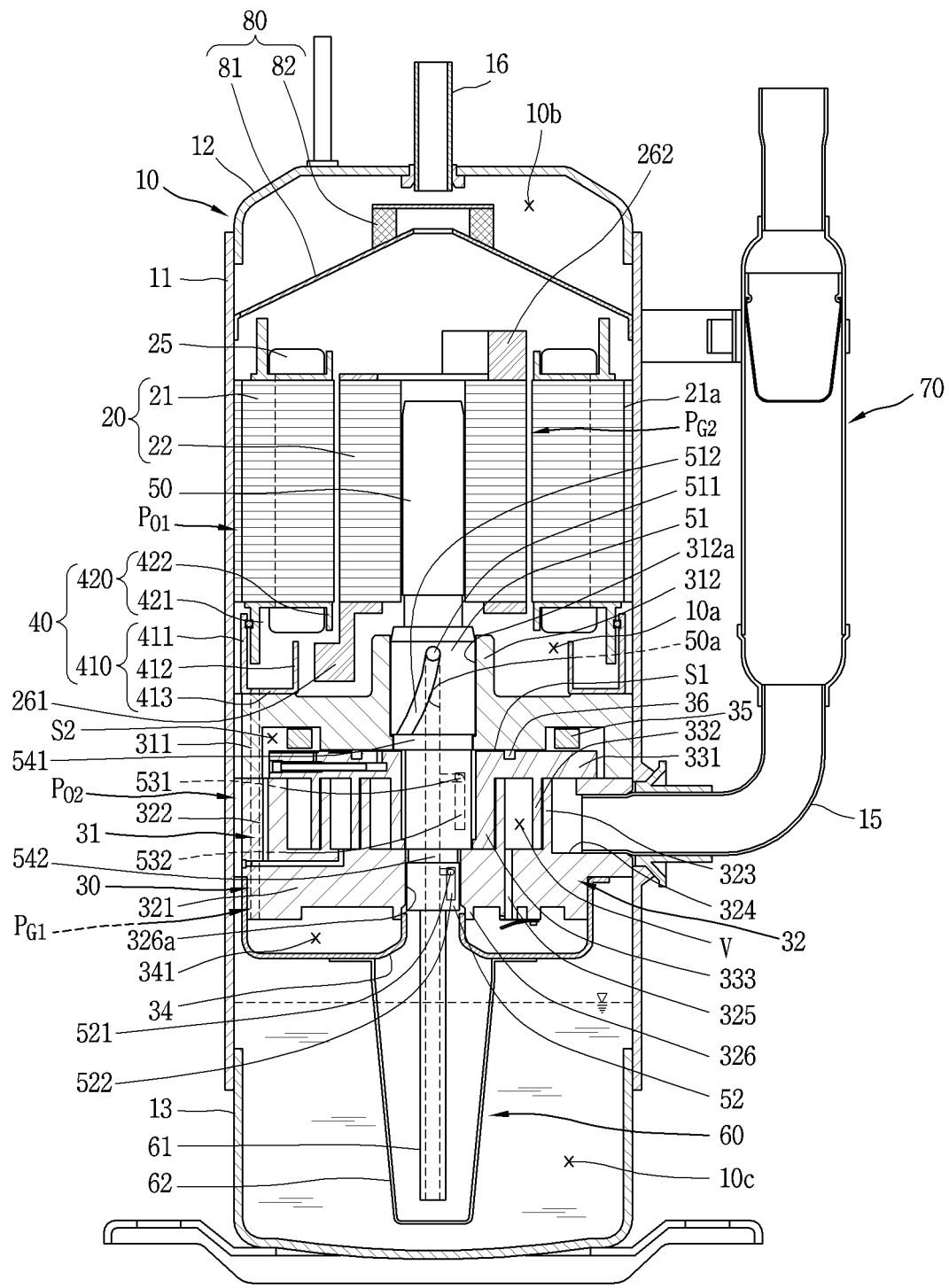
FIG. 1 is a vertical cross-sectional diagram illustrating a lower compression type of scroll compressor according to the present invention.
Figure 2:
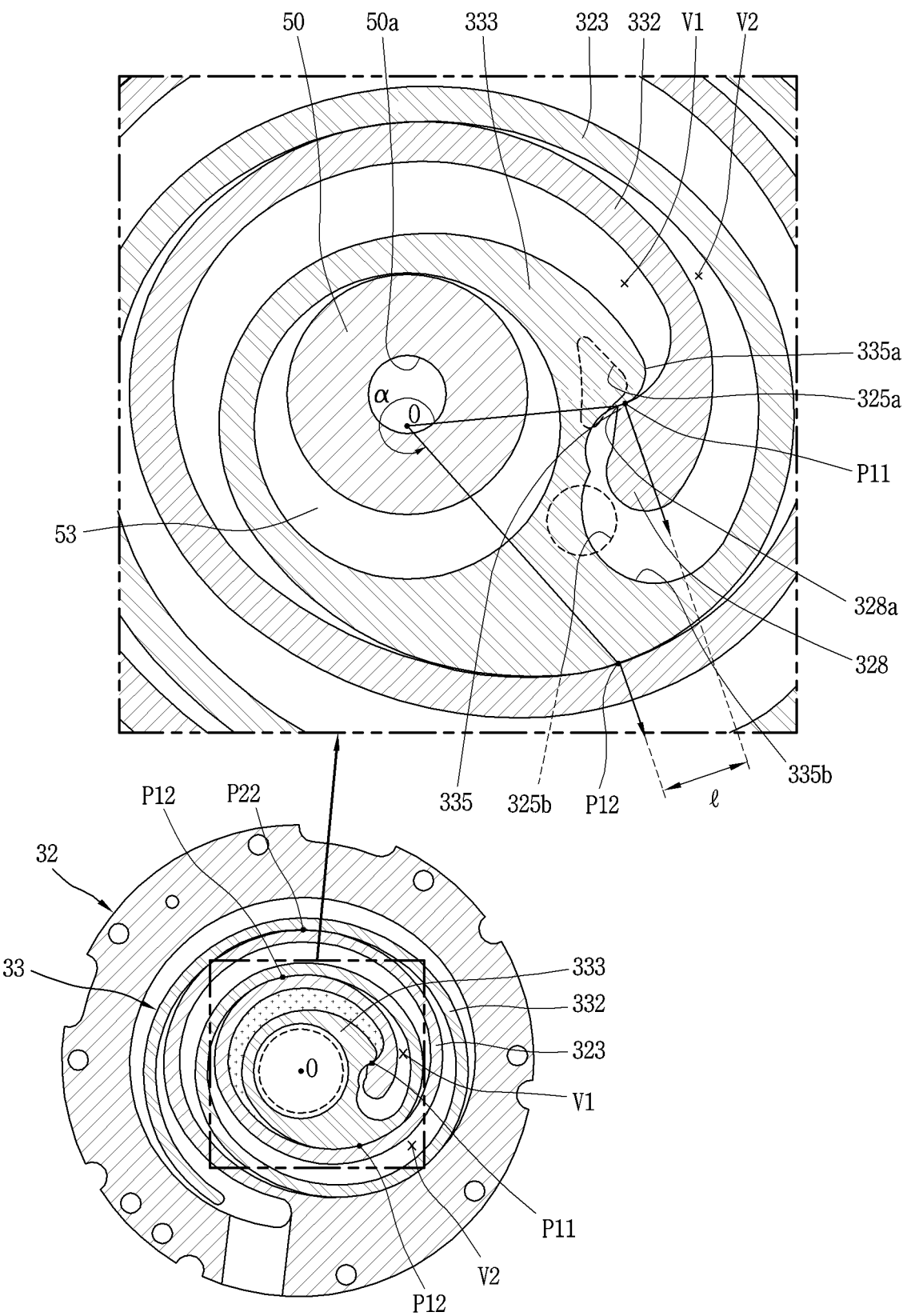
FIG. 2 is a horizontal cross-sectional diagram illustrating a compression unit in FIG. 1.
Figure 3:
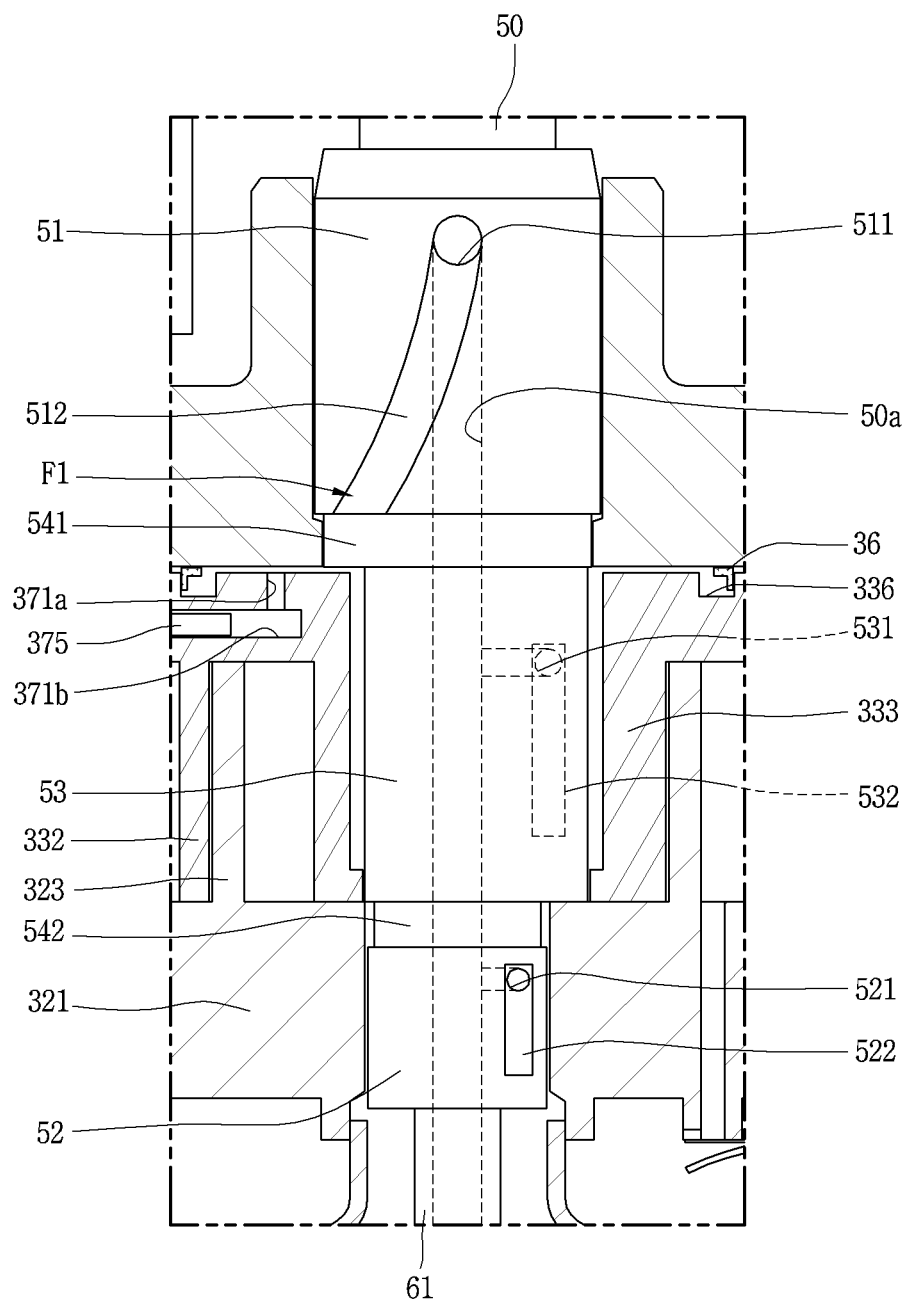
FIG. 3 is a front-view diagram illustrating a portion of a rotation shaft for describing a sliding member in FIG. 1.
Figure 4:
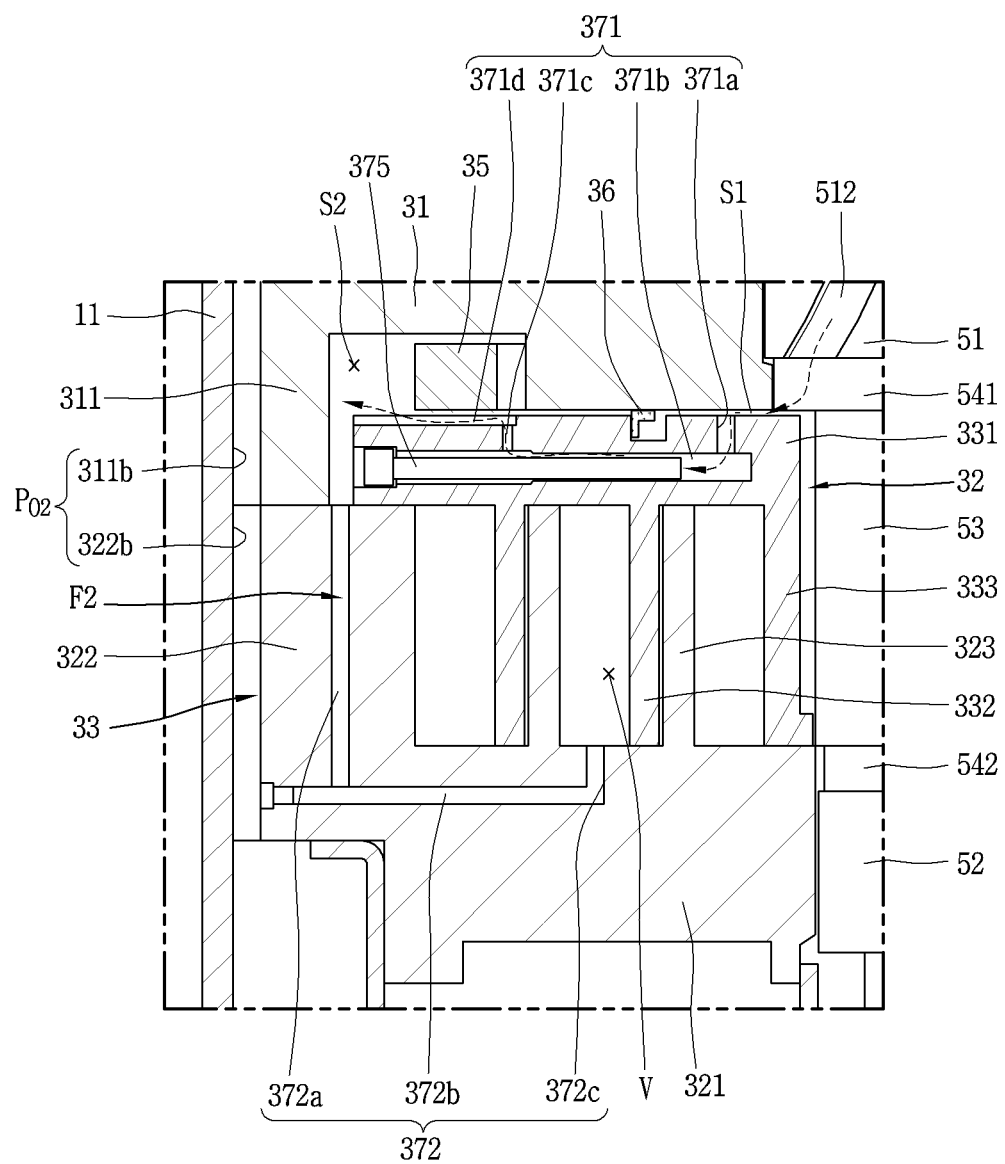
FIG. 4 is a vertical cross-sectional diagram for describing an oil supply path between a backpressure chamber and a compression chamber in FIG. 1.

FIG. 1 is a vertical cross-sectional diagram illustrating a lower compression type of scroll compressor according to the present invention. FIG. 2 is a horizontal cross-sectional diagram for describing a sliding member in FIG. 1, illustrating a compression unit in FIG. 1. FIG. 3 is a front-view diagram illustrating a portion of a rotation shaft. FIG. 4 is a vertical cross-sectional diagram for describing an oil supply path between a backpressure chamber and a compression chamber.

With reference to FIG. 1, a lower compression type of scroll compressor according to the present embodiment includes an electric motor 20 and a compression unit 30 within a casing 10. The electric motor 20 serves as a drive motor and generates rotary force. The compression unit 30 is installed under the electric motor 20 between a prescribed space (hereinafter referred to as an intermediate space) 10a. The compression unit 30 is provided with the rotary force of the electric motor 20 and compresses a refrigerant.

The casing 10 is configured to include a cylindrical shell 11 that makes up a sealed receptacle, an upper shell 12 that covers an upper portion of the cylindrical shell 11 to make up the sealed receptacle along with the cylindrical shell 11, and a lower shell 13 that makes up the sealed receptacle along with the cylindrical shell 11 and, at the same time, forms an oil storage space 10c.

A refrigerant absorption pipe 15 passes through a flank surface of the cylindrical shell 11 and communicates directly with an absorption chamber of the compression unit 30. A refrigerant discharge pipe 16 that communicates with an upper space 10b in the casing 10 is installed in an upper portion of the upper shell 12. The refrigerant discharge pipe 16A corresponds to a path along which a compressed refrigerant that is discharged from the compression unit 30 to the upper space 10b in the casing 10 is exhausted to the outside. The refrigerant discharge pipe 16 is inserted into up to the middle of the upper space 10b in the casing 10 in such a manner that a type of oil separation space is formed in the upper space 10b. Then, whenever necessary, an oil separator (not illustrated) that separates oil from an oil-mixed refrigerant may be installed within the casing 10 including the upper space 10b, or within the upper space 10b, in a manner that is connected to the refrigerant absorption pipe 15.

The electric motor 20 is configured with a stator 21 and a rotor 22 that rotates within the stator 21. Teeth and slots that make up multiple coil winding portions (each of which has a reference numeral) are formed along a circumferential direction on an inner circumferential surface of a stator 21, and a coil 25 is wound around the stator 21. A second refrigerant flow passage PG2 is formed that results from combining a gap between the inner circumferential surface of the stator 21 and an outer circumferential surface of the rotor 22 and the coil winding portions. Accordingly, the refrigerant, which is discharged to the intermediate space 10c between the electric motor 20 and the compression unit 30 through a first refrigerant flow passage PG1 that will be described below, moves to the upper space 10b that is formed above the electric motor 20, through the second refrigerant flow passage PG2 that is formed in the electric motor 20.

Then, multiple D-cut surfaces are formed along the circumferential direction on an outer circumferential surface of the stator 21. A first oil flow passage PO1 is formed on the D-cut surface 21a in such a manner that oil passes between the D-cut surface 21a itself and an inner circumferential surface of the cylindrical shell 11. Accordingly, the oil, which is separated from the refrigerant, moves to a lower space 10c through the first oil flow passage PO1 and through a second oil flow passage PO2 that will be described below.

A frame 31, which serves as the compression unit 30 with a prescribed gap between the frame 31 itself and the stator 21, is connected fixedly with the inner circumferential surface of the casing 10 under the stator 21. The frame 31 is fixedly connected to the inner circumferential surface of the cylindrical shell 11 using a shrink fitting method or a welding manner.

Then, a frame side-wall portion (a first side-wall portion) 311 that takes the shape of a ring is formed on an edge of the frame 31. Multiple communicating grooves 311b are formed along the circumferential direction in an outer circumferential surface of the first side-wall portion 311. The communicating groove 311b, along with a communicating groove 322b in a first scroll 32 that will be described below, forms the second oil flow passage PO2.

Furthermore, a first shaft bearing unit 312 for supporting a main bearing unit 51 of a rotation shaft 50 that will be described below is formed on the center of the frame 31. A first shaft bearing hole 312a, into which the main bearing unit 51 of the rotation shaft 50 is rotatably inserted for support in a radial direction, is formed in the first shaft bearing unit 312 to pass through the first shaft bearing unit 312 in an axial direction.

Then, a stationary scroll (hereinafter referred to as a first scroll) 32 is installed on a lower surface of the frame 31 with the lower surface itself of the frame 31 and an orbiting scroll (hereinafter referred to as a second scroll) 33 eccentrically connected to the rotation shaft 50 in between. The first scroll 32 may be connected to the frame 31 in a fixed manner, or may be connected to the frame 31 in a manner that is movable in the axial direction.

On the other hand, on the first scroll 32, a stationary disc portion (hereinafter referred to as a first disc portion) 321 is formed in approximately the shape of a circle. A scroll side-wall portion (hereinafter referred to as a second side-wall portion) 322, which is connected to an edge of a lower surface of the frame 31, is formed on an edge of the first disc portion 321.

An absorption inlet 324, through which the refrigerant absorption pipe 15 and the absorption chamber communicate with each other, is formed one side of the second side-wall portion 322 to pass through the one side of the second side-wall portion 322. Discharge outlets 325a and 325b, which communicate with a discharge chamber and through which the compressed refrigerant is discharged, are formed in a center portion of the first disc portion 321. One discharge outlet 325a or 325b may be formed in such a manner as to communicate with both a first compression chamber V1 and a second compression chamber V2, which will be described below, and multiple discharge outlets, that is, the discharge outlets 325a and 325b may be formed independently in such a manner as to communicate with the compression chambers V1 and V2, respectively.

Then, the communicating groove 322b, which is described above, is formed in an outer circumferential surface in the second side-wall portion 322. The communicating groove 322b, along with the communicating groove 311b in the first side-wall portion 311, forms the second oil flow passage PO2 for guiding oil that is collected, to the lower space 10c.

Furthermore, a discharge cover 34 for guiding a refrigerant that is discharged from the compression chamber V, to a refrigerant flow passage, which will be described below, is connected to a lower side of the first scroll 32. An internal space in the discharge cover 34 is formed in such a manner as to accommodate the discharge outlets 325a and 325b, and, at the same time, in such a manner as to accommodate an entrance to the first refrigerant flow passage PG1 that guides the refrigerant that is discharged from the compression chamber V through the discharge outlet 325 a or 325b, to the upper space 10b in the casing 10, more precisely, to a space between the electric motor 20 and the compression unit 30.

At this point, the first refrigerant flow passage PG1 is formed to pass through the second side-wall portion 322 of the stationary scroll 32 and the first side-wall portion 311 of the frame 31, sequentially, starting from inside of a flow passage separation unit 40, that is, from the rotation shaft 50 that is positioned inward from the flow passage separation unit 40. Accordingly, the second oil flow passage PO2, which is described above, is formed outside of the flow passage separation unit 40 in such a manner as to communicate with the first oil flow passage PO1. The oil separation unit will be described in detail below.

A stationary wrap (hereinafter referred to as a first wrap) 323 is formed on an upper surface of the first disc portion 321. The stationary wrap intermeshes with an orbiting wrap (hereinafter referred to as a second wrap) 332, which will be described below, and thus makes up the compression chamber V. The first wrap 323 will be described below along with the second wrap 332.

Furthermore, a second shaft bearing unit 326, which supports a sub-bearing unit 52 of the rotation shaft 50, which will be described below, is formed on the center of the first disc portion 321. A second shaft bearing hole 326a, through which the sub-bearing unit 52 passes in the axial direction to be supported in the radial direction, is formed in the second shaft bearing unit 326.

On the other hand, an orbiting disc portion (hereinafter referred to as a second disc portion) 331 of the second scroll 33 is formed approximately in the shape of a disk. The second wrap 332, which intermeshes with the first wrap 322 and thus makes up the compression chamber, is formed on a lower surface of the second disc portion 331.

Along with the first wrap 323, the second wrap 332 may be formed in an involute shape, and may be formed in various shapes other than the involute shape. For example, as illustrated in FIG. 2, the second wrap 332 may take a shape in which multiple circular arcs that have different diameters and origins are connected to each other, and the outermost curved line is formed in the shape of approximately an ellipse that has a long axis and a short axis. The first wrap 323 may be formed in the same manner.

A rotation shaft combination portion 333, into which an eccentricity portion 53 of the rotation shaft 50 is rotatably inserted for combination, is formed in a center portion of the second disc portion 331 to pass through the center portion of the second disc portion 331 in the axial direction. The rotation shaft combination portion 333 is an internal end portion of the second wrap 332. The eccentricity portion 53 of the rotation shaft 50 will be described below.

An outer circumferential portion of the rotation shaft combination portion 333 is connected to the second wrap 332 and plays the role of forming the compression chamber V along with the first wrap 322 during a compression process.

Furthermore, the rotation shaft combination portion 333 is formed to such a height that rotation shaft combination portion 333 overlaps the second wrap 332 in the same plane, and thus the eccentricity portion 53 of the rotation shaft 50 is positioned at such a height that the eccentricity portion 53 overlaps the second wrap 332 in the same plane. When this is done, counterforce by the refrigerant and compression force against the refrigerant are applied to the same plane with respect to the second disc portion 331, and thus cancel each other out. As a result, the second scroll 33 can be prevented from being inclined due to the exertion of compression force and counterforce.

Furthermore, a recessed portion 335 that is engaged with a protruding portion 328 of the first wrap 323, which will be described below, is formed the outer circumferential portion of the rotation shaft combination portion 333 that faces an internal end portion of the first wrap 323. An increment portion 335a is formed on one side of the recessed portion 335. A thickness of the increment portion 335 increases over portions of the rotation shaft combination portion 333, starting with an inner circumferential portion thereof, ending with the outer circumferential portion thereof, upstream along a direction of forming the compression chamber V. This increases a compression path in the first compression chamber V1 immediately before discharge, and consequently, a compression ratio in the first compression chamber V1 is increased closely to a compression ratio in the second compression chamber V2. The first compression chamber V1, which is a compression chamber that is formed between an internal flank surface of the first wrap 323 and an external flank surface of the second wrap 332, will be described below separately from the second compression chamber V2.

A circular-arc compression surface 335b that takes the shape of a circular arc is formed on the other side of the recessed portion 335. A diameter of the circular-arc compression surface 335b is determined by an internal end portion thickness (that is, a thickness of a discharge end) of the first wrap 323 and an orbiting radius of the second wrap 332. When the internal end portion thickness of the first wrap 323 is increased, the diameter of the circular-arc compression surface 335b is increased. As a result, a thickness of the second wrap in the vicinity of the circular-arc compression surface 335b is increased, and the compression path is lengthened. The compression ratio in the second wrap V2 is increased as much as the compression path is lengthened.

Furthermore, the protruding portion 328, which protrudes from the outer circumferential portion side of the rotation shaft combination portion 333, is formed in the vicinity of an internal end portion (an absorption end or a start end) of the first wrap 323, which corresponds to the rotation shaft combination portion 333. A contact portion 328a, which protrudes from the protruding portion 328 and is engaged with the recessed portion 335, is formed on the protruding portion 328. That is, the internal end portion of the first wrap 323 is formed in such a manner that the internal end portion has a greater thickness than other portions. As a result, wrap strength of the internal end portion of the first wrap 323, on which the largest compression force is exerted is improved, thereby increasing the durability.

On the other hand, the compression chamber V is formed between the first disc portion 321 and the first wrap 323, and between the second wrap 332 and the second disc portion 331, and is configured to include an absorption chamber, an intermediate pressure chamber, and a discharge chamber that are successively formed along a direction in which a wrap progresses.

As illustrated in FIG. 2, the compression chamber V is configured to include the first compression chamber V1 that is formed between the internal flank surface of the first wrap 323 and the external flank surface of the second wrap 332, and the second compression chamber V2 that is formed between an external flank surface of the first wrap 323 and an internal flank surface of the second wrap 332.

That is, the first compression chamber V1 includes a compression chamber that is formed between two contact points P11 and P12 which occur when the internal flank surface of the first wrap 323 and the external flank surface of the second wrap 332 are brought into contact with each other. The second compression chamber V2 includes a chamber that is formed between two contact points P21 and P22 which occur when the external flank surface of the first warp 323 and the internal flank surface of the second wrap 332 are brought into contact with each other.

At this point, when the greater of angles that the two contact points P11 and P12 that connect the center of the eccentricity portion 53, that is, the center O of the rotation shaft combination portion 333 and the two contact points P11 and P12, respectively, make with respect to each other is defined as having a value of $\alpha$, $\alpha < 360°$ at least immediately before discharge start, and a distance I between normal vectors at the two contact points P11 and P12 has a value of 0 or greater.

For this reason, the first compression chamber immediately before the discharge has a smaller volume than is the case when the stationary wrap and the orbiting wrap that take the shape of an involute curve, and thus the compression ratio in the compression chamber V1 and the compression ratio in the compression chamber V2 are both improved without increasing sizes of the first wrap 323 and the second wrap 332.

On the other hand, as described above, the second scroll 33 is installed, in a manner that enables the second scroll 33 to orbit, between the frame 31 and the stationary scroll 32. Then, an Oldham ring 35 that prevents the second scroll 33 from rotating about its axis is installed between an upper surface of the second scroll 33 and a lower surface of the frame 31 that corresponds to the upper surface of the second scroll 33. A sealing member 36, which forms a backpressure chamber S1 that will be described below, is installed more inward than the Oldham ring 35.

Then, as a result of an oil supply hole 321a that is provided in the second scroll 32, an intermediate pressure space is formed outside of the sealing member 36. The intermediate pressure space communicates with the compression chamber V and, when filled with an intermediate-pressure refrigerant, plays the role of the backpressure chamber. Accordingly, the counterpressure chamber that is formed more inward than the sealing member 36 is defined as a backpressure chamber S1, the counterpressure chamber that is formed more outward than the sealing member 36 is defined as a second backpressure chamber S2. Consequently, the backpressure chamber S1 is a space that is formed by a lower surface the frame 31 and an upper surface of the second scroll 33 with the sealing member 36 in between. The backpressure chamber S1 will be again described below along with the sealing member.

On the other hand, the flow passage separation unit 40 is installed in the intermediate space 10a that is a passing-through space which is formed between a lower surface of the electric motor 20 and an upper surface of the compressor unit 30. The flow passage separation unit 40 plays the role of preventing the refrigerant that is discharged from the compressor unit 30 from interfering with the oil that flows from the upper space 10b of the electric motor 20, which is the oil separation space, into a lower space 10c in the compressor unit 30 that is the oil storage space.

To do this, the flow passage separation unit 40 according to the present embodiment includes a flow passage guide that separates the first space 10a into a space (hereinafter referred to as a refrigerant flow space) in which the refrigerant flows, and a space (hereinafter referred to as an oil flow space) in which the oil flows. Only with the flow passage guide itself, the first space 10a is separated into the refrigerant flow space and the oil flow space, but whenever necessary, a combination of multiple passage guides may play the role of the flow passage guide.

The flow passage separation unit 40 according to the present embodiment is configured with a first flow passage guide 410 that is provided on the frame 31 and extends upward, and a second flow passage guide 420 that is provided on the stator 21 and extends downward. The first flow passage guide 410 and the second flow passage guide 420 overlap in the axial direction, and thus the intermediate space 10a is separated into the refrigerant flow space and the oil flow space.

The first flow passage guide 410 here is manufactured in the shape of a ring, and is connected fixedly with an upper surface of the frame 31. The second flow passage guide 420 here is formed to be inserted into the stator 21 and to extend from an insulator that insulates a wound coil.

The first flow passage guide 410 is configured with a first annular wall portion 411 that extends upward at the outside, a second annular wall portion 412 that extends upward at the inside, and an annular surface portion 413 that extends in the radial direction in such a manner as to connect between the first annular wall portion 411 and the second annular wall portion 412. The first annular wall portion 411 is formed to be at a higher height than the second annular wall portion 412. A refrigerant through-hole is formed in the annular surface portion 413 in such a manner that a refrigerant hole provides communication from the compressor unit 30 to the intermediate space 10a.

Then, a first balance weight 261 is positioned inward from the second annular wall portion 412, that is, in the rotation shaft direction. The first balance weight 261 is connected to the rotor 22 or the rotation shaft 50 for rotation. At this point, the first balance weight 261 rotate to agitate refrigerant. The first balance weight 261 prevents the refrigerant from moving toward the first balance weight 261 due to the second annular wall portion 412, and thus suppresses the refrigerant from being agitated by the first balance weight 261.

The second flow passage guide 420 is configured with a first extension portion 421 that extends downward at the outside of the insulator, and a second extension portion 422 that extends downward at the inside of the insulator. The first extension portion 421 is formed in such a manner as to overlap the first annular wall portion 411 in the axial direction, and plays the role of performing separation into the refrigerant flow space and the oil flow space. The second extension portion 422 may not be formed if necessary. In a case where the second extension portion 422 is formed, it is desirable that the second extension portion 422 does not overlap the second annular wall portion 412 in the axial direction. In a case where the second extension portion 422 is formed to overlap the second annual wall portion 412, it is desirable that the second extension portion 422 is positioned in the radial direction at a sufficient distance away from the second annual wall portion 412 in such a manner that the refrigerant flows sufficiently.

A passage sealing member 430 for completely separating two spaces, that is, the first space 10a and a space at the outside of the first space 10a, is provided between the first annular wall portion 411 of the first flow passage guide 410 and the second extension unit 421 of the second flow passage guide 420.

On the other hand, an upper portion of the rotation shaft 50 is pressure-inserted into the center of the rotor 22 for combination and a lower portion thereof is connected to the compression unit 30 for support in the radial direction. Accordingly, the rotation shaft 50 transfers the rotary power of the electric motor 20 to the orbiting scroll 33 of the compression unit 30. Then, the second scroll 33 that is eccentrically connected to the rotation shaft 50 performs an orbiting motion with respect to the first scroll 32.

The main bearing unit (hereinafter referred to as the first bearing unit) 51, which is inserted into the first shaft bearing hole 312a in the frame 31 for support in the radial direction, is formed on a lower half portion of the rotation shaft 50. The sub-bearing unit 52 (hereinafter referred to as the second bearing unit) 52, which is inserted into the second shaft bearing hole 326a in the first scroll 32 for support in the radial direction, is formed under the first bearing unit 51. Then, the eccentricity portion 53, which is inserted into the rotation shaft combination portion 333 for combination, is formed between the first bearing unit 51 and the second bearing unit 52.

The first bearing unit 51 and the second bearing unit 52 is formed on the same axial line, in such a manner as to have the same axial center. The eccentricity portion 53 is essentially formed in the radial direction with respect to the first bearing unit 51 or the second bearing unit 52. The second bearing unit 52 may be eccentrically formed with respect to the first bearing unit 51.

In a case where an outside diameter of the eccentricity portion 53 is formed to be smaller than an outside diameter of the first bearing unit 51, but to be greater than an outside diameter of the second bearing unit 52, is advantageous in that the rotation shaft 50 passes the shaft bearing holes 312a and 326a and the rotation shaft combination portion 333 for combination. However, in a case where the eccentricity portion 53 is formed using a separate bearing, without being integrally with the rotation shaft 50, the rotation shaft 50 is inserted for combination even if the outside diameter of the second bearing unit 52 is formed to be smaller than the outside diameter of the eccentricity portion 53.

Then, an oil supply flow passage 50a for supplying oil to each bearing unit and the eccentricity portion is formed, along the axial direction, inside of the rotation shaft 50. The compression unit 30 is positioned below the electric motor 20, and thus the oil supply flow passage 50a is formed, by grooving, to a height from a lower end of the rotation shaft 50 to approximately a lower end of the stator 21, to the middle of the height, or to a position that is higher than an upper end of the first bearing unit 51. Of course, when necessary, the oil supply path 50a may be formed to pass through the rotation shaft 50 in the axial direction.

Then, an oil feeder 60 for pumping the oil with which the lower space 10c is connected to the lower end of the rotation shaft 50, that is, a lower end of the second bearing unit 52. The oil feeder 60 is configured to include an oil supply pipe 61 that is inserted into the oil supply flow passage 50a in the rotation shaft 50 for combination, and a blocking member 62 that accommodate the oil supply pipe 61 and block introduction of a foreign material. The oil supply pipe 61 is positioned to pass through the discharge cover 34 and to be immersed in the oil in the lower space 10c.

On the other hand, as illustrated in FIG. 3, a sliding member oil supply path F1 for supplying oil to each sliding member, which is connected to the oil supply flow passage 50a, is formed in each bearing unit 51 or 52 of the rotation shaft 50 and the eccentricity portion 53.

The sliding member oil supply path F1 is configured to include a plurality of oil supply holes, that is, oil supply holes 511, 521, and 531 to pass through in the oil supply flow passage 50a toward an outer circumferential surface of the rotation shaft 50, and a plurality of oil supply grooves, that is, oil supply grooves 512, 522, and 532 in the bearing units 51 and 52 and an outer circumferential surface of the eccentricity portion 53, which communicate with the oil supply holes 511, 521, and 531, respectively, for lubricating the bearing units 51 and 52 and the eccentricity portion 53 with oil.

For example, the first oil supply hole 511 and the first oil supply groove 512 are formed in the first bearing unit 51, the second oil supply hole 521 and the second oil supply groove 522 are formed in the second bearing unit 52, and the third oil supply hole 531 and the third oil supply groove 532 are formed in the eccentricity portion 53. The first oil supply groove 512, the second oil supply groove 522, and the third oil supply groove 532 each are formed in the shape of a longitudinal groove that runs lengthwise in the axial direction or in an inclination direction.

Then, a first connection groove 541 and a second connection groove 542 are formed between the first bearing unit 51 and the eccentricity portion 53, and the eccentricity portion 53 and the second bearing unit 52, respectively. A lower end of the first oil supply groove 512 communicates with the first connection groove 541, and an upper end of the second oil supply groove 522 communicates with the second connection groove 542. Thus, a portion of the amount of oil with which the first bearing unit 51 is lubricated along the first oil supply groove 512 flows along the first connection groove 541, and collects. This oil is in turn introduced into the first backpressure chamber S1 and forms backpressure of discharge pressure. Furthermore, oil with which the second bearing unit 52 is lubricated along the second oil supply groove 522, and oil with which the eccentricity portion 53 is lubricated along the third oil supply groove 532 collects on the second connection groove 542. This oil in turn passes between a front surface of the rotation shaft combination portion 333 and the first disc portion 321 and is introduced into the compression unit 30.

Then, a small amount of oil that is absorbed upward above the first bearing unit 51 flows out from an upper end of the first shaft bearing unit 312 of the frame 31 to outside of the bearing surface, then flows over the first shaft bearing unit 312 down to an upper surface 31a of the frame 31, and lastly flows over the oil flow passages PO1 and PO2, which are successively formed on an outer circumferential surface (or a groove in an upper surface, which communicates with the outer circumferential surface) of the frame 21 and an outer circumferential surface of the first scroll 32, respectively, into the lower space 10c for collection.

In addition, oil that, along with the refrigerant, is discharged from the compression chamber V to the upper space 10b in the casing 10 is separated from the refrigerant in the upper space 10b in the casing 10, and then flows along the first oil flow passage PO1, which is formed in an outer circumferential surface of the electric motor 20, and the second oil flow passage PO2, which is formed in an outer circumferential surface of the compression unit 30, into the lower space 10c for collection. The flow passage separation unit 40, which will be described below, is provided between the electric motor 20 and the compression unit 30. Thus, the oil, which is separated from the refrigerant in the upper space 10b and flows into the lower space 10c, interferes with and is mixed again with the refrigerant that is discharged in the compression unit 20 and flows into the upper space 10b. The oil and the refrigerant flow along paths PO1 and PO2 and the paths PG1 and PG2, which are different from each other, into the lower space 10c and the upper space 10b, respectively.

On the other hand, a compression chamber oil-supply path F2 for supplying the oil that flows along the oil supply flow passage 50a and then is absorbed upward, to the compression chamber V is formed in the second scroll 33. The compression chamber oil-supply path F2 is connected to the sliding member oil supply path F1, which is described above.

The compression chamber oil-supply path F2 is configured to include a communicating first oil supply flow path 371 that connects between the oil supply flow passage 50a and the second backpressure chamber S2 that serves as the intermediate pressure space, and a second oil supply flow path 372 that communicates with the intermediate pressure chamber of the compression chamber V.

Of course, the directly-communicating compression chamber oil-supply path F2 may be formed to connect between the oil supply flow passage 50a and the intermediate pressure chamber without the second backpressure chamber S2 being involved. However, in this case, a communicating refrigerant flow passage needs to be separately provided between the second backpressure chamber S2 and the intermediate pressure chamber V, and an oil flow passage for supplying oil to the oldham ring 35 that is positioned in the second backpressure chamber S2 needs to be separately provided. This increases the number of paths and makes processing complex. Therefore, at least to unify the refrigerant flow passage and the oil flow passage and thus to decrease the number of paths, as in the present embodiment, it is desirable that the oil supply flow passage 50a and the second backpressure chamber S2 communicates with each other and that the second backpressure chamber S2 communicates with the intermediate pressure chamber V.

To do this, the first oil supply path 371 includes a first orbiting path portion 371a that is formed in the lower surface of the second disc portion 331 to run up to the middle in the thickness direction, a second orbiting path portion 371b that is formed to extend from the first orbiting path portion 371a toward an outer circumferential surface of the second disc portion 331, and third orbiting path portion 371c to pass through toward the upper surface of the second disc portion 331, which is formed to extend from the second orbiting path portion 371b.

Then, the first orbiting path portion 371a is formed in a position in which the first backpressure chamber S1 is positioned, and the third orbiting path portion 371c is formed in a position in which the second backpressure chamber S2 is positioned. Then, a pressure reducing bar 375 is inserted into the second orbiting path portion 371b in such a manner that pressure of oil that flows from the first backpressure chamber S1 to the second backpressure chamber S2 along the first oil supply path 371 is reduced. Accordingly, a cross-sectional area of the second orbiting path portion 371b except for the pressure reducing bar 375 is smaller than that of the first orbiting path portion 371a or the third orbiting path portion 371c.

At this point, in a case where an end portion of the third orbiting path portion 371c is formed in such a manner that the end portion is positioned inward than the oldham ring 35, that is, is positioned between the oldham ring 35 and the sealing member 36, oil that flows along the first oil supply path 371 is blocked by the oldham ring 35 and thus does not flow smoothly to the second backpressure chamber S2. Therefore, in this case, a fourth orbiting path portion 371d is formed to extend from an end portion of the third orbiting path portion 371c toward the outer circumferential surface of the second disc portion 331. The fourth orbiting path portion 371d, as illustrated in FIG. 4, may be formed to be a groove in an upper surface of the second disc portion 331, and may be formed to be a hole in the inside of the second disc portion 331.

The second oil supply path 372 includes a first stationary path portion 372a that is formed in an upper surface of the second side-wall portion 322 in the thickness direction, a second stationary path portion 372b that is formed to extend from the first stationary path portion 372a in the radial direction, and third stationary path portion 372c that is formed to extend from the second stationary path portion 372b and to communicate with the intermediate pressure chamber V.

A reference numeral 70 in the drawing, which is not described, indicates an accumulator.

The lower compression type of scroll compressor according to the present embodiment, which is described above, operates as follows.

That is, when the electric motor 20 is powered on, rotary power occurs to the rotor 22 and the rotation shaft 50, and the rotor 22 and the rotation shaft 50 rotate. As the rotation shaft 50 rotates, with the Oldham ring 35, the orbiting scroll 33 that is eccentrically connected to the rotation shaft 50 performs the orbiting motion.

Then, a refrigerant that is supplied from outside of the casing 10 through the refrigerant absorption pipe 15 is introduced into the compression chamber V. This refrigerant is compressed as the volume of the compression chamber V decreases by the orbiting motion of the orbiting scroll 33. The compressed refrigerant is discharged into the internal space in the discharge cover 34 through the discharge outlets 325a and 325b.

Then, the refrigerant that is discharged into the internal space in the discharge cover 34 circulates in the internal space in the discharge cover 34. After noise decreases, the refrigerant flows into a space between the frame 31 and the stator 21, and flows into an upper space over the electric motor 20 through a space between the stator 21 and the rotor 22.

Then, the refrigerant that results from separating the oil from the refrigerant in the upper space over the electric motor 20 is discharged to outside of the casing 10 through the refrigerant discharge pipe 16, and on the other hand, the oil flows into the lower space 10c that is the oil storage space in the casing 10 through a passage between the inner circumferential surface of the casing 10 and the stator 21 and a passage between the inner circumferential surface of the casing 10 and the outer circumferential surface of the compression unit 30. A sequence of these processes is repeated.

At this time, the oil in the lower space 10c is absorbed upward flowing along the oil supply flow passage 50a in the rotation shaft 50, and the first bearing unit 51 and the second bearing unit 52, and the eccentricity portion 53 are lubricated with the oil that flows along the oil supply holes 511, 521, and 531 and the oil supply grooves 512, 522, and 532, respectively.

The oil that flows along the first oil supply hole 511 and the first oil supply groove 512, with which the first bearing unit 51 is lubricated, collects in the first connection groove 541 between the first bearing unit 51 and the eccentricity portion 53 and is introduced into the first backpressure chamber S1. The oil generates almost discharge pressure and thus pressure in the first backpressure chamber S1 is increased to the discharge pressure. Therefore, the center portion side of the second scroll 33 is supported, in the axial direction, by the discharge pressure.

On the other hand, the oil in the first backpressure chamber S1 flows into the second backpressure chamber S2 along the first oil supply path 371 due to a pressure difference with the second backpressure chamber S2. At this time, the pressure reducing bar 375 is provided in the second orbiting path portion 371b that serves as the first oil supply path 371, and thus pressure of the oil that flows toward the second backpressure chamber S2 is reduced.

Then, the oil that flows into the second backpressure chamber (the intermediate pressure space) S2 supports an edge portion of the second scroll 33, and at the same time, flows into the intermediate pressure chamber V along the second oil supply path 372 due to a pressure difference with the intermediate pressure chamber V. However, when pressure in the intermediate pressure chamber V is higher than pressure in the second backpressure chamber S2 during the operation of the compressor, the refrigerant flows from the intermediate pressure chamber V toward the second backpressure chamber S2 along the second oil supply path 372. In other words, the second oil supply path 372 plays the role of a passage along which the refrigerant and the oil flow in opposite directions due to the pressure difference between the second backpressure chamber S2 and the intermediate pressure chamber V.

As described above, the oil separation unit 40 is installed in the intermediate space (hereinafter referred to as a first space) 10a that is a passing-through space which is formed between a lower surface of the electric motor 20 and an upper surface of the compression unit 30. The oil separation unit 40 plays the role of preventing the refrigerant that is discharged from the compression unit 30 from interfering with the oil that flows from the upper space (hereinafter referred to as a second space) 10b in the electric motor 20, which is the oil separation space, into a lower space (hereinafter referred to as a third space) 10c in the compression unit 30 that is the oil storage space. Accordingly, the refrigerant and the oil are discharged together in the compressor unit 30, pass through the electric motor 20. The refrigerant and the oil that pass through the electric motor 20 are separated into the refrigerant and the oil in the second space 10b that is the upper space. The separated oil flows over a first oil flow passage PO1 and a second oil flow passage PO2 into the third space 10c, which is the oil storage space, for collection.

However, because an oil separation device is not present in the second space 10b, or because an oil separation effect is small although the oil separation device is present there, there is a concern that the oil will be driven out of the compressor along with the refrigerant. If so, an amount of oil that flows into the third space 10c that is the oil storage space in the compressor, for collection, greatly decrease, and thus an amount of oil that is supplied to the sliding member decrease. As a result, friction loss or abrasion occurs.

Particularly, the separation of oil within the compressor has a strong relationship with a flow speed of the refrigerant (hereinafter referred to as refrigerant oil) include the oil. It is known that, in a case where the flow speed of the refrigerant oil is low or high, normally, a centrifugal separation technique is suitable. In the case of the low speed, inter-particle collision does not actively take place, but the degree to which the refrigerant oil spread is low. This increases a particle size of the oil. Thus, the oil separation effect that results from gravitational precipitation is improved. In the case of the high speed, the inter-particle collision actively takes place, and oil particles are combined. The combined oil particles are more pulled by the centrifugal force than the refrigerant. Thus, due to the oil separation effect that results from inertia, the oil is separated from the refrigerant.

However, in the case of an intermediate speed, it is difficult to expect the oil separation effect in the case of the low speed, which results from the gravitational precipitation, or the oil separation effect in the case of the high speed, which results from the inertia. Therefore, in the case of the intermediate speed, it is desirable that the oil separation device is provided rather than employing the centrifugal separation technique.

However, in the related art, as described above, the oil is separated without the oil separation device being provided, using the gravitational precipitation technique or the centrifugal separation technique in the space, and thus, the gravitational precipitation technique or the centrifugal separation technique is expected to have its own effect in the low-speed or high-speed operation (the term speed of flow within a compression casing is actually an exact expression, but for convenience, the term operation speed of a compressor is hereinafter instead used because the speed of flow is approximately proportional to the operation speed of the compressor). However, the gravitational precipitation technique or the centrifugal separation technique has a limitation in that the oil separation is small. However, in a case where the second space 10b is too much enlarged in order to secure an oil separation space, the compressor increases in size. Thus, a volume of the second space 10b has to be limited. Therefore, the oil is not sufficiently separated from the refrigerant oil that is introduced in the second space 10b, and thus is driven out of the compressor along with the refrigerant. As a result, an oil shortage occurs within the compressor. This situation will be described below with reference to FIG. 10.

Figure 5:
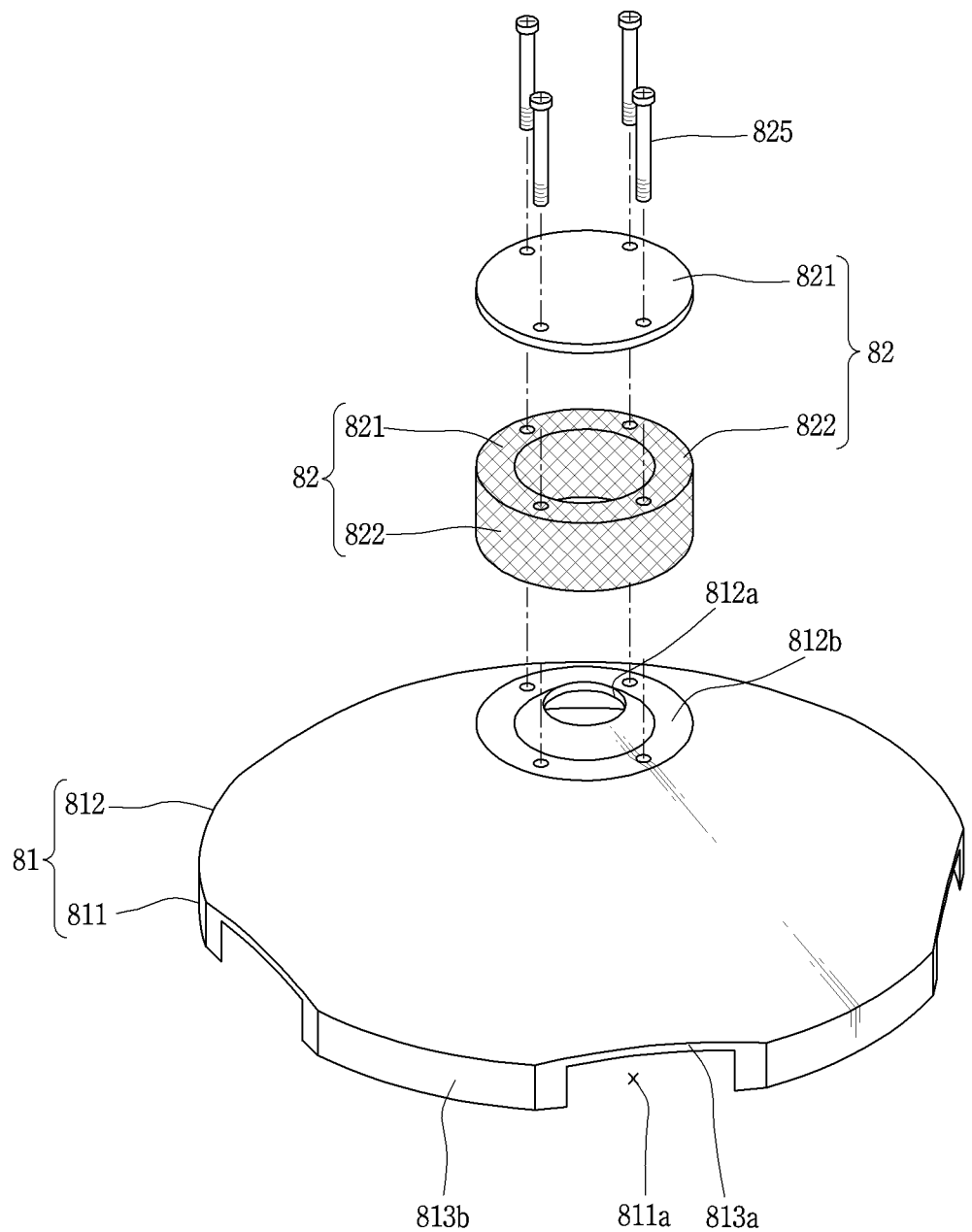
FIG. 5 is an exploded perspective diagram illustrating a flow passage separation unit in the scroll compressor in FIG. 1.
Figure 6:
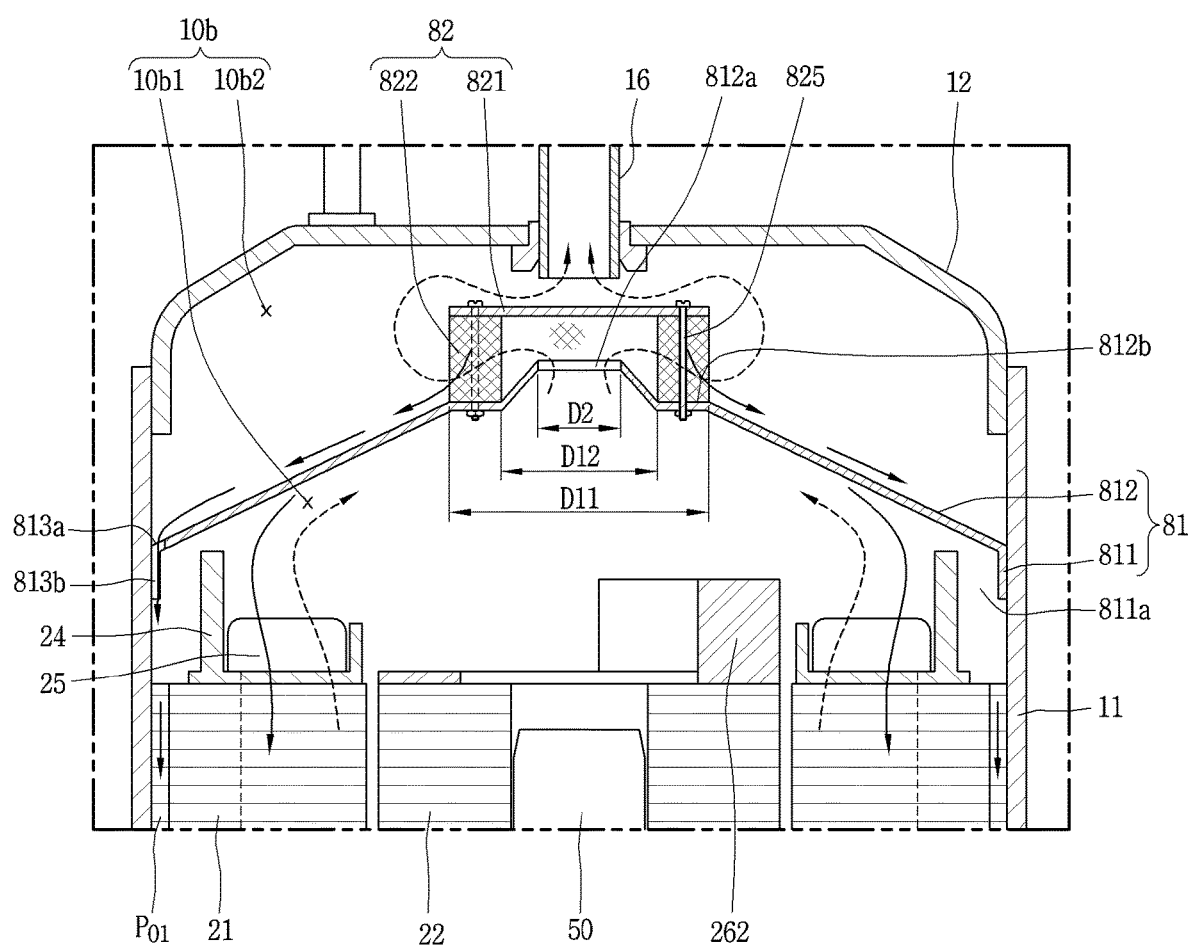
FIG. 6 is a vertical cross-sectional diagram illustrating an assembled state of the oil separation unit in FIG. 5.

With this in mind, the lower compressor type of scroll compressor according to the present embodiment includes oil a separation unit that actively deals with a change in the operation speed of the compressor, in the second space. FIGS. 5 and 6 are diagrams, each illustrating an example of the oil separation unit.

As illustrated, an oil separation unit 80 according to the present embodiment is configured with a guidance member 81 that is provided above the electric motor 20, and an oil separation member 82 through which the refrigerant oil that is guided by the guidance member 81 passes. The oil is separated from the refrigerant oil that passes through the oil separation member 82.

The guidance member 81 is configured with a first guidance portion 811 that is formed into the shape of a cylinder and has a lower opening 811a, and a second guidance portion 812 that is formed in the shape of a truncated cone and has an upper opening 812a.

Of course, the guidance member 81 may be all formed in the shape of a truncated cone without the first guidance portion 811. However, in this case, the guidance member 81 is difficult to fix to the casing 10 or the stator 21, and the guidance member 81 is too close to an outlet of the second refrigerant flow passage PG2. Thus, the path along which the refrigerant oil flows is narrow and the refrigerant oil that flows into the second space 10b experiences a high flow path resistance. Therefore, it is desirable that the first guidance portion 811 in the shape of a cone with a predetermined height is provided in such a manner that the flow passage is secured for the refrigerant oil.

Furthermore, a lower end of the first guidance portion 811, that is, the lower opening 811a may be fixed between the second refrigerant flow passage PG2 that makes up an internal flow passage above the electric motor 20 and the first oil flow passage PO1 that makes up an external flow passage, and the lower opening 811a may separate the refrigerant flow passage and the oil flow passage. However, the lower end of the first guidance portion 811 does not necessarily need to be positioned between the second refrigerant flow passage PG2 and the oil flow passage PO1. That is, if the end portion of the first guidance portion 811 is positioned on the intermediate of the first oil flow passage PO1 or if the end portion of the first guidance portion 811, like an outer circumferential surface of the first oil flow passage PO1, is positioned outward from an outer circumferential surface of the second refrigerant flow passage PG2, this is sufficient. Therefore, the guidance member 81 according to the present embodiment may be fixed to the inner circumferential surface of the cylindrical shell 11 in the second space 10b.

In this case, as illustrated in FIGS. 5 and 6, multiple oil path surfaces 813a each of which is positioned at a distance away from the inner circumferential surface of the cylindrical shell 11 and make up a type of oil flow passage, are formed, at a fixed distance away from each other, along the circumferential direction, on a lower half portion of the guidance member 81, that is, in the vicinity where the first guidance portion 811 and the second guidance portion 812 meets. Each of the oil path surfaces 813a, as illustrated in FIG. 5, may be formed by being cut in a straight line. However, whenever necessary, the oil path surface 813a may be formed by being cut in the shape of a semicircle, or may be formed without being cut, by deforming a portion of the outer circumferential surface. Accordingly, each of the multiple stationary surfaces 813b, which are fixed by pressure-inserting an outer circumferential surface of the first guidance portion 811 into the inner circumferential surface of the cylindrical shell 11 for fixation or by welding the outer circumferential surface of the first guidance portion 811 on the inner circumferential surface of the cylindrical shell 11, is formed between each of the oil path surfaces 813a.

The guidance member 81 here may be formed of metal material and may be formed of a plastic material. However, in a case where the guidance member 81 is connected to the casing 10, because the welding or the pressure inserting is performed, it is desirable that the guidance member 81 is formed of metal material if possible.

Figure 7:
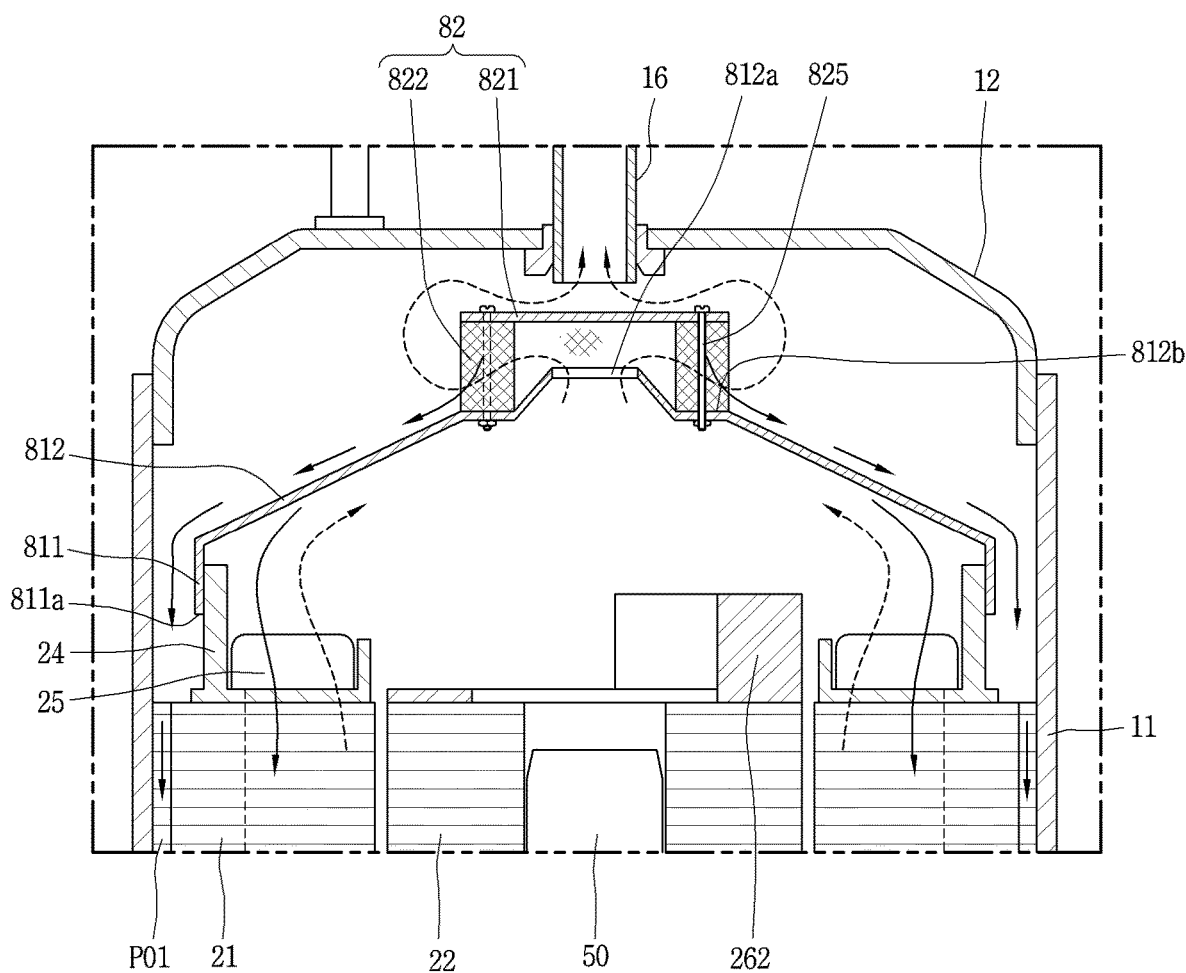
FIG. 7 is a vertical cross-sectional diagram illustrating the oil separation unit in FIG. 5, which includes a guidance member according to another embodiment.

Furthermore, the guidance member 81, as illustrated in FIG. 7, may be fixed to an upper surface of the stator 21. In this case, the lower end of the first guidance portion 811 may be combined directly with the upper surface of the stator 21. For example, in a case where the guidance member 81 is metal, the guidance member 81 is fixed to the upper surface of the stator 21 with an insulating material between the guidance member 81 and the stator 21. However, considering the efficiency of the electric motor 20, it is desirable that the guidance material 81 is formed of plastic material.

In a case where the guidance member 81 is formed of plastic material in this manner, the guidance member 81 may be fixed to the stator 21 using a bolt or a separate fastening means, but, as illustrated in FIG. 7, may be inserted into an insulator 24 on the upper side, which insulates the coil 25, for combination. In this case, for firm fixation, the guidance member 81 may be combined using a hook and may be joined using adhesive. Furthermore, a separate fastening member may be used. However, in this case, the outer circumferential surface of the first guidance portion 811 is positioned at a distance away from the inner circumferential surface of the casing 10, and a separate oil flow passage surface on the guidance member 81.

Furthermore, the second guidance portion 812, as described above, is formed into the shape of a truncated cone, and thus an outer circumferential surface of the second guidance portion 812 is formed in a manner that is inclined from the lower end to the upper end. However, a support surface 812b is formed, in a flat manner, along the circumferential direction, on an upper end of the second guidance portion 812, that is, on an outer circumferential surface in the vicinity of the upper opening 812a, of the second guidance portion 12, in such a manner that a lower surface of the oil separation member 82 is located. A fastening hole is formed in the support surface 812b in such a manner a fastening bolt 825 for fixing the oil separation member 82 is tightened. Accordingly, an inlet that communicates with the upper opening 812a in the guidance member 81 is formed in the center portion of the oil separation member 82, and an outlet is formed in a mesh 822 that will be described below. Then, the oil separation member 82 is positioned at a distance away from an inlet of the refrigerant discharge pipe 16, in the axial direction, and is supported by the guidance member 81.

Furthermore, as described above, a lower portion of the guidance member 81 is connected to the inner circumferential surface of the casing 10 and the upper surface of the stator 21, and an upper portion of the guidance member 81 is connected to the lower surface of the oil separation member 82. Thus, the second space 10b in the casing 10 is separated by the guidance member 81 and the oil separation member 82 into an internal space 10b1 and the external space 10b2. Accordingly, the internal space 10b1 is a space into which the refrigerant and the oil flows in a mixed state, and the external space 10b2 is a space in which the refrigerant and the oil are separated from each other. The refrigerant in the external space 10b2 flow into the refrigerant discharge pipe 16.

On the other hand, as illustrated in FIGS. 5 and 6, the oil separation member 82 is configured with a plate 821 and the mesh 822 that is positioned on a lower surface of the plate 821 and plays the role of a type of oil filter.

The plate 821 is configured in a circular shape or the like. The plate 821 here is formed into a closed shape in such a manner that the refrigerant oil which passes through the upper opening 812a in the guidance member 81 is guided in the radial direction toward the mesh 822, without passing through the plate 821.

The plate 821 is formed in such a manner that an upper surface of the plate 821 faces a lower end of the refrigerant discharge pipe 16 in a state where the upper surface of the plate 821 is positioned at a fixed distance away from the lower end of the refrigerant discharge pipe 16. At this point, the center of the plate 821 is positioned on the same axis as the center of the refrigerant discharge pipe 16.

The term mesh may also be expressed as a porous member. That is, in the present embodiment, the oil separation member 82 does not necessarily need to be limited to an oil filter in the shape of a mesh. In other words, the mesh 822 may be formed into the shape of a cylinder that has many fine holes. Therefore, the mesh may be any oil filter through which the refrigerant and the oil are separated from the refrigerant oil. However, in the present embodiment, for convenience, as a typical example, the mesh is described.

The mesh 822 is formed into the shape of a cylinder. Accordingly, an empty space in a center portion of the oil separation member 82 forms an inlet that communicates with the upper opening 812a, and a flank surface of the oil separation member 82 forms an outlet that is configured with the mesh 822. Accordingly, the refrigerant oil that is guided by the guidance member 81 to the internal space 10b1 of the second space 10b is introduced into the separation member 82 along a lower surface of the oil separation member 82, and passes through the mesh 822 that is the flank surface, resulting in the oil being separated from the refrigerant oil. The resulting refrigerant flows into the external space 10b2 of the second space 10b.

Then, the oil separation member 82 is formed to have an external diameter D11 that is greater than an internal diameter D2 of the upper opening 812a in the guidance member 81. The oil separation member 82 is formed to have an internal diameter D12 that is equal or greater than the internal diameter D2 of the upper opening 812a in the guidance member 81. Accordingly, the oil that is filtered out by the mesh 822, which is the flank surface of the oil separation member 82, does not flow back into the internal space 10b1 of the guidance member 81, and flows downs to the oil flow passage PO1 along an external flank surface of the guidance member 81. Of course, in a case where the mesh 822 of the oil separation member 82 is inclined downward toward the radial direction, the oil that is separated from the refrigerant oil flows toward the first oil passage PO1 in a more effective manner.

Figure 8:
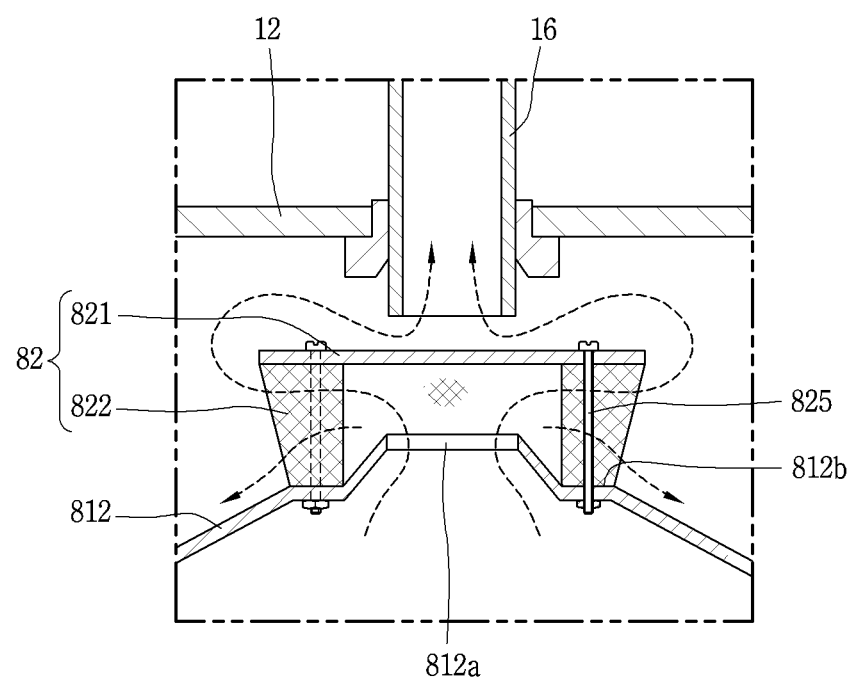
FIG. 8 is a vertical cross-sectional diagram illustrating the oil separation unit in FIG. 5, which has an oil separation member according to another embodiment.

At this point, the mesh 822 may be formed to have the same width in the radial direction, that is, to have the same external diameter, but as illustrated in FIG. 8, may be formed in such a manner that as we go upward the mesh 822, the external diameter (or the width length in the radial direction) increases gradually. This improves the oil separation effect much more, considering the fact that a relatively large amount of refrigerant oil passes through the upper side of the separation member 82.

Figure 9:
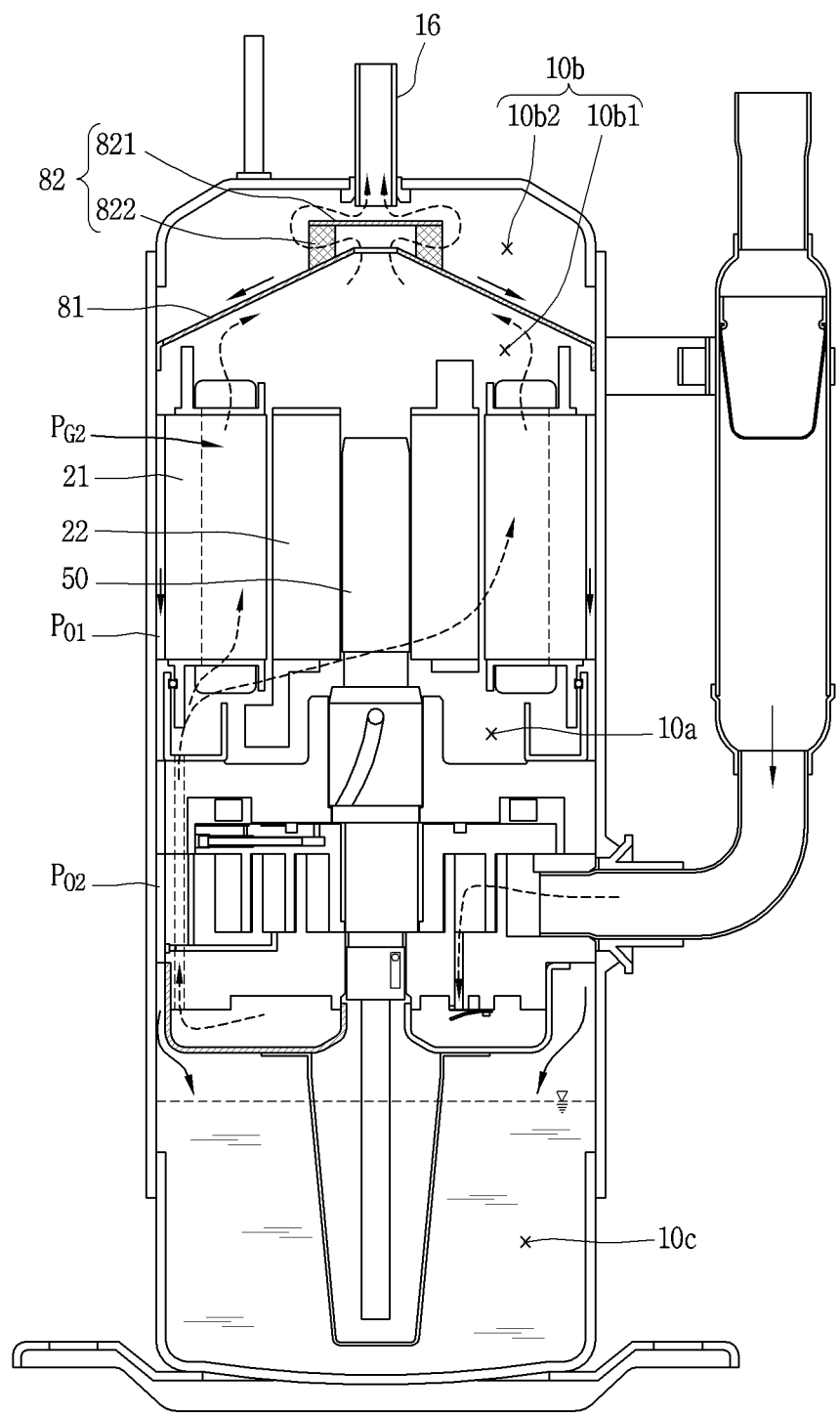
FIG. 9 is a schematic diagram for describing a process in which a refrigerant and oil circulate in the lower compressor type of scroll compressor that is illustrated in FIG. 1.

A process of separating oil form refrigerant in the scroll compressor according to the present embodiment, as described above, is as follows. FIG. 9 is a schematic diagram for describing a process in which the refrigerant and the oil circulate in the lower compressor type of scroll compressor that is illustrated in FIG. 1.

As illustrated, refrigerant that is discharged from the compressor unit 30 flows into the internal space 10b1 of the second space 10b through the first refrigerant flow passage PG1 and the second refrigerant flow passage PG2, in a state where oil is included in the refrigerant. The refrigerant and the oil that flow into the internal space 19b1 of the second space 10b flows toward the upper opening 812a along the guidance member 81, and then is introduced to a center portion of the oil separation member 82, which is an inlet of the oil separation member 82.

The refrigerant and the oil passes through the mesh 822 that is the flank surface, which serves as an outlet of the oil separation member 81, resulting in the oil being separated from the refrigerant oil. The refrigerant that results from the separation, while circulating through the external space 10b2 of the second space 10b, is driven out of the compressor through the refrigerant discharge pipe 16. On the other hand, the oil that result from the separation flows toward the first oil flow passage PO1 in the radial direction along an outer circumferential surface of the guidance member 81.

The oil, as described above, flows into the third space 10c along the second oil passage PO2, and is resupplied to the sliding member through the oil feeder 60.

Accordingly, before the refrigerant oil that is discharged from the compressor unit 30 is driven out of the compressor through the refrigerant discharge pipe 16, the oil is effectively separated by the oil separation unit 80 from the refrigerant oil. Thus, a situation that the oil, along with the refrigerant, is exhausted to the outside of the compressor is minimized. Furthermore, the friction loss or the abrasion is suppressed in advance from occurring on the sliding member due to an oil shortage within the casing 10.

Figure 10:
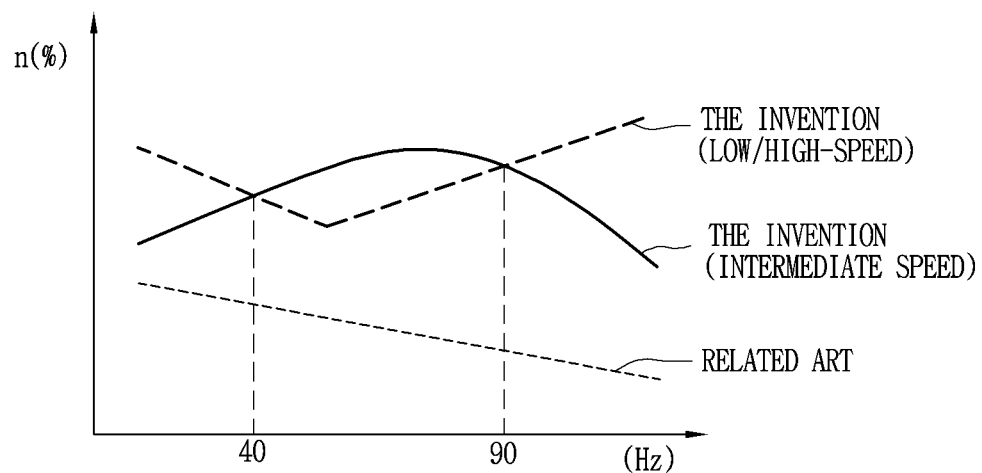
FIG. 10 is a graph for describing an effect of the oil separation unit according to the present invention.

Particularly, through the use of the mesh, the oil separation unit according to the present embodiment smoothly separates the oil from the refrigerant oil even when the compressor operates at an intermediate speed. This effect is illustrated in FIG. 10.

As illustrated, in a case where the oil separation unit is not provided (in the related art), as the operation speed of the compressor increases, an oil separation rate (%) rapidly decreases. This means that as the operation speed increases, an amount of oil that is driven out of the compressor increases rapidly.

However, in a case where, as in the present embodiment, the oil separation unit 80 that includes the mesh is provided, overall, the oil separation rate (%) is improved greatly than in the related art. Particularly, it can be seen that, due to characteristics of a filtration and separation technique, the oil separation rate (n %) is greatly improved when an intermediate speed range (approximately 50 to 90 Hz) is provided. In a case where the compressor operates at an intermediate speed, the oil that flows into the second wrap 10*b* is separated from the refrigerant while passing through the mesh 822 that makes up the oil separation member 82. Accordingly, in addition to a centrifugal separation effect that results from the centrifugal force, a filtration and separation effect that results from the mesh 822 of the oil separation member 82 takes place in the internal space 10*b*1 of the second space 10*b*. Thus, the oil separation rate (n %) is greatly improved.

Furthermore, the oil separation rate (n %) is lower than in the centrifugal separation technique, in a case where the compressor operates at the low or high speed, but is more improved than in the related art. In the present embodiment, the oil separation member 82 that includes the mesh 822 contributes to the improvement in the oil separation rate, when compared with a compressor in the related art, which does not include an oils separation device. Furthermore, the guidance member 81 of the oil separation unit 80 according to the present embodiment achieves a type of centrifugal separation effect, thereby further improving the oil separation rate. That is, in the present embodiment, in a case where the compressor operates at a high speed, the oil that is included in the refrigerant oil is pulled by centrifugal force of the rotating rotor 22 while flowing from the second refrigerant flow passage PG2 into the second space 10*b*, this centrifugal force causes oil particles to collide with each other and thus to be connected to each other, forming bigger oil particles. As a result, the oil is easy to separate from the refrigerant oil. The guidance member 81 according to the present embodiment is formed into the shape of a cone that tapers from a base to a point, and thus a cyclone effect in which the refrigerant and the oil flows along an inner circumferential surface of the guidance member 81 is achieved. Thus, the oil separation effect is more increased.

Furthermore, in a case where the compressor operates at a low speed, oil particles that flows into the second space 10*b* collide with the guidance member 81, and thus are connected to each other on a surface of the guidance member 81, forming bigger oil particles. As a result, due to the gravity, a big particle is easy to separate from the refrigerant oil.

Accordingly, in the present embodiment, regardless of the operation speed of the compressor, the refrigerant and the oil are effectively separated from each other. Particularly, in the case of an intermediate-speed operation, even the oil that has not yet been separated by the centrifugal separation can be effectively separated. The oil shortage within the compressor is prevented in advance as much as the oil is separated.

Figure 11:
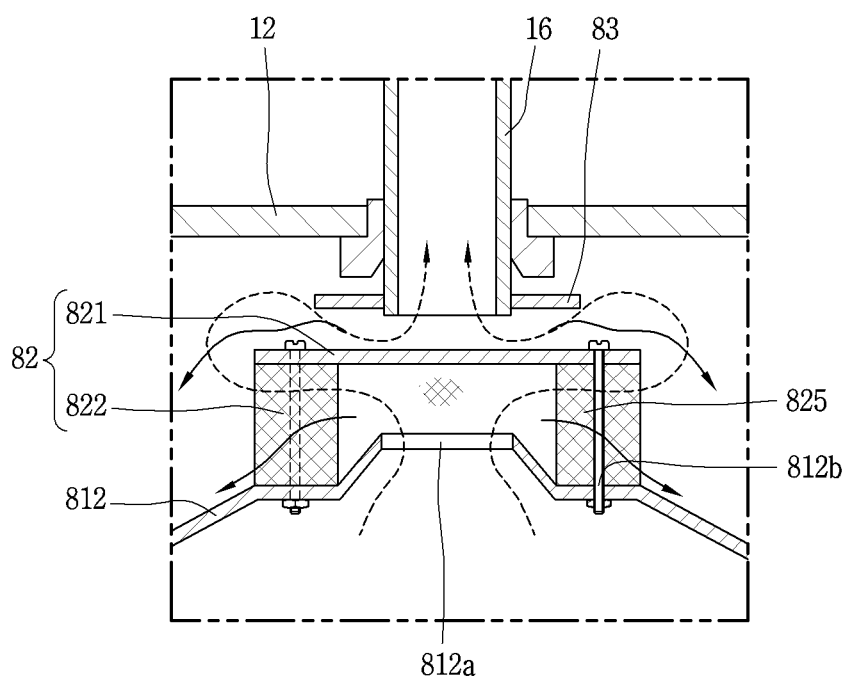
FIG. 11 is a schematic diagram for describing flows of refrigerant and oil that is separated from the refrigerant in the scroll compressor in FIG. 1.

On the other hand, as illustrated in FIG. 11, an oil separation plate 83 that extends in the radial direction is further formed in the vicinity of an inlet of the refrigerant discharge pipe 16. Accordingly, the oil that has not yet been separated in the oil separation member 82 is brought into contact with the oil separation plate 83, and thus is separated from the refrigerant oil. As a result, the oil separation effect is more increased.

On the other hand, a guidance member according to another embodiment of the present invention is as follows.

That is, in the embodiment described above, the guidance member is formed into the shape of a truncated cone, the lower opening in the guidance member is connected to the casing or the stator for fixation, and thus the oil separation member is connected to the upper opening in the guidance member. However, in the present embodiment, the guidance member is provided in such a manner that the lower opening is connected to the rotor or the rotation shaft and thus that the guidance member rotates along with the rotor or the rotary shaft. In this case, unlike in the embodiment described above, the oil separation may be connected to the discharge pipe or the casing, instead of being connected to the guidance member. An example in which the guidance member and the oil separation member are connected to the rotor and the discharge pipe, respectively, will be described below in a focused manner.

Figure 12:
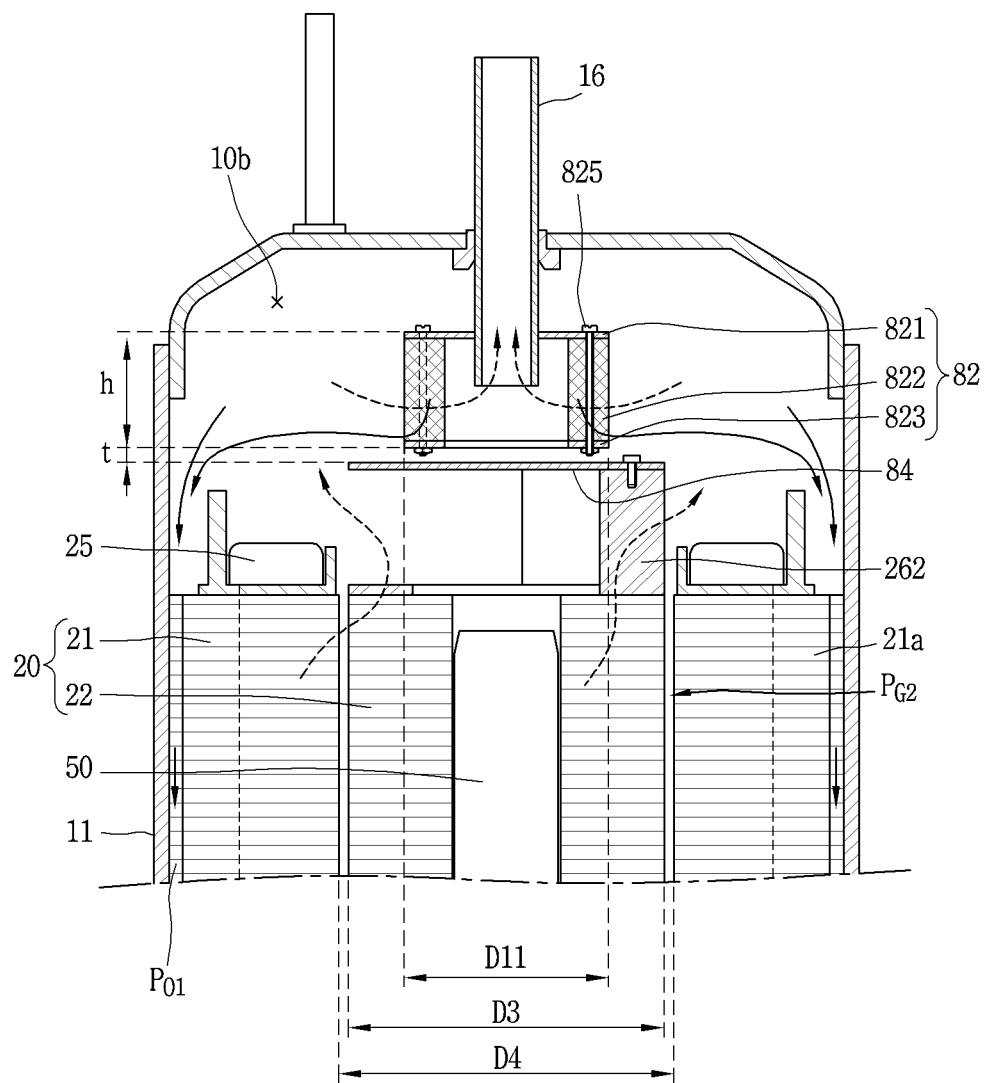
FIG. 12 is a vertical cross-sectional diagram illustrating an oil separation unit according to another embodiment, in the scroll compressor in FIG. 1.

As described in FIG. 12, the guidance member 81 according to the present embodiment is positioned at a distance away from the oil separation member 82 and is connected to an upper surface of the rotor 22, more precisely, an upper surface of a second balance weight 262 that is provided on the rotor 22. Of course, the rotation shaft 50 may extend, and the guidance member 84 may be connected to an upper end of the rotation shaft 50 that extends.

The oil separation member 82 is formed into the shape that is similar to that in the embodiment described above. The oil separation member 82 according to the present embodiment is formed into the shape of a ring. An upper surface thereof is formed into a shape that is closed by the plate 821. A flank surface thereof is configured with the mesh 822 that serves a filtering film through which the refrigerant oil passes, resulting in the oil being separated. A lower surface thereof is formed into a shape that is open.

At this point, the upper surface and the flank surface of the oil separation member are similar to those in the embodiment described, but the lower surface of the oil separation member is somewhat different from that in the embodiment described above. That is, in the embodiment described, the guidance member 81 is connected to the lower surface of the oil separation member 82 and thus a plate in the shape of a ring for combining the guidance member 81 with the lower surface of the oil separation member 82 may be provided. However, in the present embodiment, the lower surface of the oil separation member 82 is kept positioned at a distance away from the guidance member 84. Thus, a separate plate does not need to be provided. In a case where the plate is wide, the oil rather builds up on the plate, and is swept away by along with the refrigerant that passes through the mesh 822. Thus, the oil may be discharged to the refrigerant discharge pipe 16, thereby further increasing the amount of oil that is driven out of the compressor. Accordingly, in the present embodiment, it is preferable that the lower surface of the oil separation member 82 is formed into a completely-open shape, or that, although a separate plate for fixing the mesh to the plate on the upper surface is provided, the separate plate is shaped in the shape of a ring in such a manner that the oil does not built up on the separate plate.

Then, the refrigerant discharge pipe 16 is inserted into the center of the plate 821 that serves as an upper surface of the oil separation member 82, for combination with the plate 821. In this case, it is desirable that, in order to utilize the mesh 822 to a larger extent, the refrigerant discharge pipe 16 is inserted downward to half or more than half a height of the mesh 822 that serves as the flank surface.

For example, when an inlet end (a lower end) 16*a* of the refrigerant discharge pipe 16 and a lower end of the plate 821 that serves as the upper surface are on the same plane, or when the refrigerant discharge pipe 16 is inserted downward to less than the height of the mesh 822, a lower portion of the mesh 822 is not sufficiently utilized. Thus, a utilization level of the mesh 822 decreases. Therefore, it is desirable that the refrigerant discharge pipe 16 is inserted down to half or more than half the height of the mesh 822.

The guidance member 84 is formed into the shape of a circle with a predetermined area, and is connected to the upper surface of the second balance weight 262. Of course, the rotation shaft 50 may extend in the axial direction, and the guidance member 84 may be connected to the upper end of the rotation shaft 50. The guidance member 84 is different from that in the present embodiment, which will be described below, in terms of only a combination position, but is the same as that in the present embodiment in terms of a basic effect of operation. Thus, a description thereof is omitted. However, in a case where the guidance member is connected to the rotation shaft, an eccentric load increases as much as the rotation shaft extends, but the combination of the center of the guidance member with the rotation shaft holds the guidance member more firmly in place.

Furthermore, the guidance member 84 is positioned in the axial direction at a predetermined distance t away from a lower surface of the oil separation member 82. At this point, it is desirable that the guidance member 84 and the oil separation member 82 are formed in such a manner that the distance t between an upper surface of the guidance member 84 and a lower surface of the oil separation member 82 is smaller than a height h of a flank surface of the oil separation member 82 in order to introduce the refrigerant and the oil toward the mesh that is the flank surface, rather than toward the lower surface.

Furthermore, from the perspective of assembling, it is desirable that the guidance member 84 is formed in such a manner that an outside diameter D3 of the guidance member 84 is equal or smaller than an inside diameter of the stator 21. That is, from the perspective of the centrifugal force, it is desirable that, as the outside diameter D3 of the guidance member 84 increases, the refrigerant oil is guided in the direction of the mesh 822 of the oil separation member 82. However, from the perspective of inserting the rotor 22 into the stator 21, it is desirable that the outside diameter D3 of the guidance member 84 is equal to or smaller than the an inside diameter D4 of the stator 21, and it is more desirable that the outside diameter D3 of the guidance member 84 is smaller than the inside diameter D4 of the stator 21, or is equal or smaller than an outside diameter of the rotor 22. Accordingly, the refrigerant and the oil that flows into the second space 10*b* along with the second refrigerant flow passage PG2 is more pushed by the centrifugal force due to the guidance member 84, and thus the refrigerant and the oil are also separated in considerably large amounts by the guidance member 84 from each other.

It is desirable that the guidance member 84 here is formed in such a manner that the outside diameter D3 of the guidance member 84 is equal or greater than the outside diameter D11 of the oil separation member 82.

A basic configuration of the oil separation member according to the present embodiment, as described above, and an effect of operation of the oil separation member are almost the same as those in the embodiments described above.

Therefore, detailed descriptions of the basic configuration and the effect of the operation are omitted. However, unlike in the embodiments described above, the guidance member 84 of the oil separation unit according to the present embodiment is configured in such a manner that the guidance member 84 is connected to the rotor 22 or the rotation shaft 50 and thus rotates along with the rotor 22 or the rotation shaft 50. Thus, a centrifugal separation effect can be more increased than in the embodiments described above.

With regard to this point, from FIG. 10, it can be seen that the oil separation rate (%) is greatly improved with a low-speed or high-speed range is provided. Therefore, in a case where the compressor operates at an intermediate speed when compared with those in the embodiments described above, the oil separation rate (%) is improved when compared with that in the related art. In addition, even in a case where the compressor operates at a low speed or a high speed, the oil separation rate (%) is greatly improved when compared with that in the related art. On the other hand, a scroll compressor according to another embodiment of the present invention is as follows.

Figure 13:
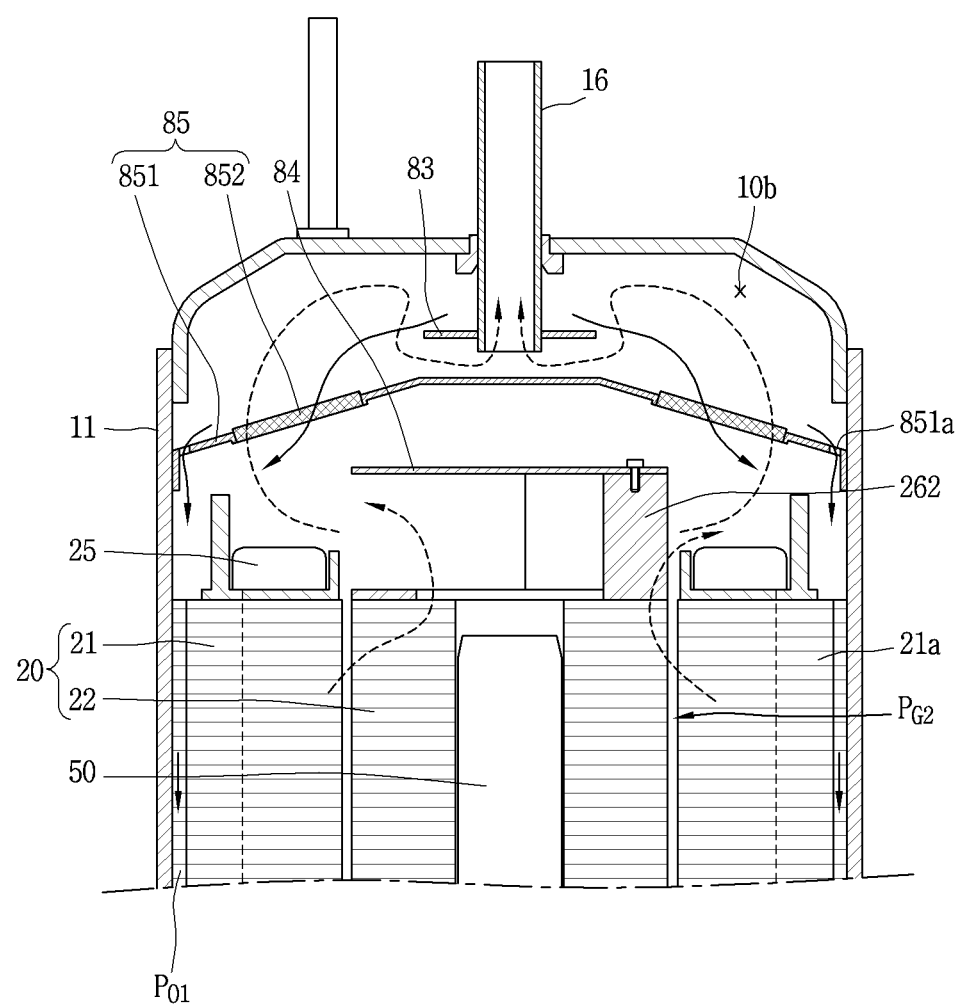
FIG. 13 is a vertical cross-sectional diagram illustrating an oil separation unit according to another embodiment, in the scroll compressor in FIG. 1.
Figure 14:
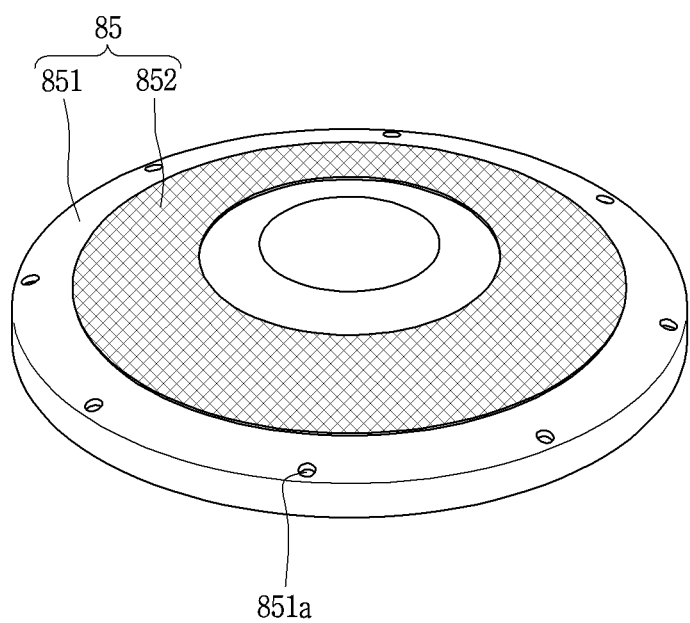
FIG. 14 is a perspective diagram illustrating the oil separation unit according to the embodiment, in the scroll compressor in FIG. 1.

That is, among the embodiments described above, in the embodiment that is illustrated in FIG. 6, the example in which the oil separation member 82 is connected to the guidance member 81 is described, and in the embodiment that is illustrated in FIG. 12, the example in which the oil separation member 82 is connected to the refrigerant discharge pipe 16 is described. However, in the present embodiment, an example in which an oil separation member 85 is fixed to the inner circumferential surface of the casing 10 is described. FIGS. 13 and 14 are vertical cross-sectional diagrams, each illustrating a scroll compressor according to the present embodiment.

As illustrated in FIG. 13, the oil separation member 85 of the scroll compressor according to the present embodiment is formed into the shape of a circular plate, and is fixedly connected to the inner circumferential surface of the cylindrical shell 11 that makes up the casing 10, in a welding manner or the like. To do this, as illustrated in FIG. 14, a plate 851 in the shape of a ring is formed on the oil separation member 85, and a mesh 852 in the shape of a ring or in the shape of an arc is provided in the middle of the plate 851.

The plate 851 is formed into the shape of a circular plate. The plate 851 is formed to have a curved shape or an inclined shape in such a manner that a center portion is convex upward. Accordingly, the oil that, while passing through the mesh 822, is separated from the refrigerant oil flows down to the inner circumferential surface of the casing 10 along an external flank surface of the plate 851 and is smoothly guided to the first oil flow passage PO1. However, considering that the oil builds up below the mesh 822, at least one or more oil holes 851*a* or oil flow passages are further formed on the plate that is positioned below the mesh 822.

The mesh 852 may be formed in the dead center of the plate 851, but considering a position of the refrigerant discharge pipe 16, it is desirable that the mesh 852 is provided in a position that does not face the refrigerant discharge pipe 16 in the axial direction. Accordingly, a portion of the plate 851, which does not face the refrigerant discharge pipe 16 in the axial direction, is formed in such a manner as to serve as a blocking portion.

Furthermore, in the present embodiment, as illustrated in FIG. 13, the guidance member 84 is provided that is connected to the upper surface of the rotor 22 or an upper end of the rotor 22. The guidance member 84 is formed in the same manner as in the embodiment that is described with reference to FIG. 12, and thus detailed descriptions of a configuration of the guidance member 84 and an effect of operation of the guidance member 84 are omitted.

Accordingly, in the present embodiment, the oil is centrifugally separated a first time by the guidance member 84, and is separated a second time by the oil separation member 85. Accordingly, a change in the operation speed of the compressor, when it occurs, is actively dealt with, and thus the oil separation effect can be increased.

Furthermore, in the present embodiment, as illustrated in FIG. 11, the oil separation plate 83 is further provided on an inlet of the refrigerant discharge pipe 16. Accordingly, in the present embodiment, the oil that has not yet been separated in the oil separation member 85 comes into contact with the oil separation plate 85, and big oil particles are formed. Thus, the oil is separated a third time. Accordingly, in the present embodiment, like in the embodiment that is described with reference to FIG. 11, the oil separation effect can be more improved.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A scroll compressor comprising:
a casing, including a sealed internal space;
a drive motor that includes a stator located in the internal space in the casing, a rotor which rotates within the stator, and a flow passage that passes through the drive motor in an axial direction;
a rotation shaft that is connected to the rotor of the drive motor and rotated by the drive motor;
a compression unit that includes a first scroll disposed below the drive motor, and a second scroll connected to the rotation shaft and engaged with the first scroll to form a compression chamber while the second scroll performs an orbiting motion with respect to the first scroll, wherein orbital motion of the second scroll relative to the first scroll causes refrigerant compressed in the compression chamber to be discharged toward the internal space in the casing;
a discharge pipe in fluid communication with an upper part of the internal space in the casing, the upper part of the internal space being formed above the drive motor;
an oil separation member disposed in the upper part of the internal space in the casing, the oil separation member being configured to separate oil from the refrigerant; and
a guidance member disposed between an upper end of the drive motor and a lower end of the discharge pipe, the guidance member being configured to guide the refrigerant with which the oil is mixed, to the oil separation member,
wherein the oil separation member is positioned at a distance away from an inlet of the discharge pipe and is connected to the guidance member, and
wherein an upper end of the guidance member defines an upper opening, a lower end of the guidance member defines a lower opening, and the guidance member divides the internal space.

2. The scroll compressor of claim 1,
wherein the lower end of the guidance member is connected to an inner circumferential surface of the casing, and an oil path groove is formed adjacent the lower end of the guidance member, and
wherein the oil separation member is connected to the upper end of the guidance member and in fluid communication with the upper opening in the guidance member.

3. The scroll compressor of claim 1,
wherein the lower end of the guidance member is located between an internal flow passage and an external flow passage of the drive motor, and
wherein the oil separation member is connected to the upper end of the guidance member and is in fluid communication with the upper opening in the guidance member.

4. The scroll compressor of claim 1, wherein:
an upper surface of the oil separation member faces an inlet of the discharge pipe and is formed with a closed plate,
a flank surface of the oil separation member is formed with a mesh through which the refrigerant passes, resulting in the oil being separated from the refrigerant, and
a lower surface of the oil separation member is in fluid communication with the upper opening in the guidance member, and is connected to the upper end of the guidance member.

5. The scroll compressor of claim 1, further comprising an oil separation plate extending in a radial direction from an outer circumferential surface of the discharge pipe and connected to an inlet of the discharge pipe.

6. The scroll compressor of claim 1, further comprising:
a flow passage separation unit having a shape of a ring, the flow passage separation unit being disposed between the drive motor and the compression unit, and separating a space between the drive motor and the compression unit into an internal space that communicates with an internal flow passage in the drive motor and an external space that communicates with an external flow passage of the drive motor.

7. A scroll compressor comprising:
a casing, including a sealed internal space;
a drive motor that includes a stator located in the internal space in the casing, a rotor which rotates within the stator, and a flow passage that passes through the drive motor in an axial direction;
a rotation shaft that is connected to the rotor of the drive motor and rotated by the drive motor;
a compression unit that includes a first scroll disposed below the drive motor, and a second scroll connected to the rotation shaft and engaged with the first scroll to form a compression chamber while the second scroll performs an orbiting motion with respect to the first scroll, wherein orbital motion of the second scroll relative to the first scroll causes refrigerant compressed in the compression chamber to be discharged toward the internal space in the casing;

a discharge pipe in fluid communication with an upper part of the internal space in the casing, the upper part of the internal space being formed above the drive motor;

an oil separation member disposed in the upper part of the internal space in the casing, the oil separation member being configured to separate oil from the refrigerant; and a guidance member disposed between an upper end of the drive motor and a lower end of the discharge pipe, the guidance member being configured to guide the refrigerant with which the oil is mixed, to the oil separation member, wherein the oil separation member is connected to the discharge pipe, and wherein:

an upper surface of the oil separation member is formed with a closed plate, and is connected to the discharge pipe, a flank surface of the oil separation member is formed with a mesh through which the refrigerant passes, resulting in the oil being separated from the refrigerant, and a lower surface of the oil separation member is formed with a ring-shaped plate of which a center portion is open.

8. The scroll compressor of claim 7, wherein the oil separation member is connected to the discharge pipe with the mesh overlapping the discharge pipe in the axial direction.

9. The scroll compressor of claim 7, wherein:
the guidance member is connected to one of the rotor of the drive motor or an upper end of the rotation shaft,
the guidance member extends toward an inner circumferential surface of the casing, and
the guidance member is positioned at a distance away from a lower surface of the oil separation member.

10. The scroll compressor of claim 9, wherein a distance between an upper surface of the guidance member and the lower surface of the oil separation member is smaller than a height of a flank surface of the oil separation member.

11. The scroll compressor of claim 10, wherein an outside diameter of the guidance member is equal to or greater than an outside diameter of the oil separation member.

12. The scroll compressor of claim 7, further comprising:
a flow passage separation unit having a shape of a ring, the flow passage separation unit being disposed between the drive motor and the compression unit, and separating a space between the drive motor and the compression unit into an internal space that communicates with an internal flow passage in the drive motor and an external space that communicates with an external flow passage of the drive motor.

13. A scroll compressor comprising:
a casing, including a sealed internal space;
a drive motor that includes a stator located in the internal space in the casing, a rotor which rotates within the stator, and a flow passage that passes through the drive motor in an axial direction;
a rotation shaft that is connected to the rotor of the drive motor and rotated by the drive motor;
a compression unit that includes a first scroll disposed below the drive motor, and a second scroll connected to the rotation shaft and engaged with the first scroll to form a compression chamber while the second scroll performs an orbiting motion with respect to the first scroll, wherein orbital motion of the second scroll relative to the first scroll causes refrigerant compressed in the compression chamber to be discharged toward the internal space in the casing;
a discharge pipe in fluid communication with an upper space part of the internal space in the casing, the upper part of the internal space being formed above the drive motor;
an oil separation member disposed in the upper part of the internal space in the casing, the oil separation member being configured to separate oil from the refrigerant; and
a guidance member disposed between an upper end of the drive motor and a lower end of the discharge pipe, the guidance member being configured to guide the refrigerant with which the oil is mixed, to the oil separation member,
wherein the oil separation member is fixedly connected to an inner circumferential surface of the casing, and
wherein the oil separation member includes a plate fixed to the inner circumferential surface of the casing, and a mesh having a shape of a ring or an arc is provided in a central portion of the plate.

14. The scroll compressor of claim 13, further comprising:
a flow passage separation unit having a shape of a ring, the flow passage separation unit being disposed between the drive motor and the compression unit, and separating a space between the drive motor and the compression unit into an internal space that communicates with an internal flow passage in the drive motor and an external space that communicates with an external flow passage of the drive motor.

* * * * *